United States Patent [19]

Bailey et al.

[11] 4,284,936

[45] Aug. 18, 1981

[54] CHOPPER TYPE PROPULSION SYSTEM WITH LOW SPEED ELECTRICAL BRAKING CAPABILITY FOR TRACTION VEHICLES

[75] Inventors: Ronald B. Bailey; Thomas D. Stitt, both of Erie, Pa.

[73] Assignee: General Electric Company, Erie, Pa.

[21] Appl. No.: 35,352

[22] Filed: May 2, 1979

[51] Int. Cl.³ .............................................. H02P 3/14
[52] U.S. Cl. ..................................... 318/381; 318/375
[58] Field of Search ............... 318/375, 376, 379, 380, 318/381, 341

[56] References Cited

U.S. PATENT DOCUMENTS

| | | | |
|---|---|---|---|
| 3,325,714 | 6/1967 | Torii | 318/376 |
| 3,546,548 | 12/1970 | Wouk | 318/376 |
| 3,715,602 | 2/1973 | Putz | 318/362 |
| 3,748,560 | 7/1973 | Sawa et al. | 318/376 |
| 3,803,472 | 4/1974 | Konrad | 318/341 |
| 3,944,856 | 3/1976 | Horie | 318/341 |
| 3,984,743 | 10/1976 | Horie | 318/375 |
| 3,996,504 | 12/1976 | Grzebielski | 318/376 |
| 4,051,421 | 9/1977 | Brinner et al. | 318/367 |
| 4,139,809 | 2/1979 | Leichle | 318/341 |

Primary Examiner—David Smith, Jr.
Attorney, Agent, or Firm—Albert S. Richardson, Jr.

[57] ABSTRACT

A propulsion system for an electrically driven traction vehicle includes a chopper, a d-c traction motor, and means effective when the system is operating in a motoring mode for connecting the chopper in series with the armature and the field windings of the motor to a d-c electric power source that includes a filter capacitor. Cyclically operative means provides periodic gating signals for alternately turning on and turning off the chopper, and it can be smoothly changed from a constant frequency, variable pulse width mode to a variable frequency, constant (minimum) off time mode so as to vary the "duty factor" of the chopper over a wide range extending up to 100 percent on time. Brake set up means is operative in response to a motoring-to-braking command for reconnecting the chopper in parallel with the motor and the filter capacitor and for reversing the polarity of the connection of the series field winding relative to the armature. In response to this operation of the brake set up means, current in the field of the motor is momentarily boosted, and an extended chopper turn on signal having a duration substantially longer than that of the aforesaid periodic gating signals is supplied to the chopper to ensure that it turns on and conducts armature current to begin the braking mode of operation even if the command happens to take place at low speeds when the electromotive force of the motor is correspondingly low.

26 Claims, 18 Drawing Figures

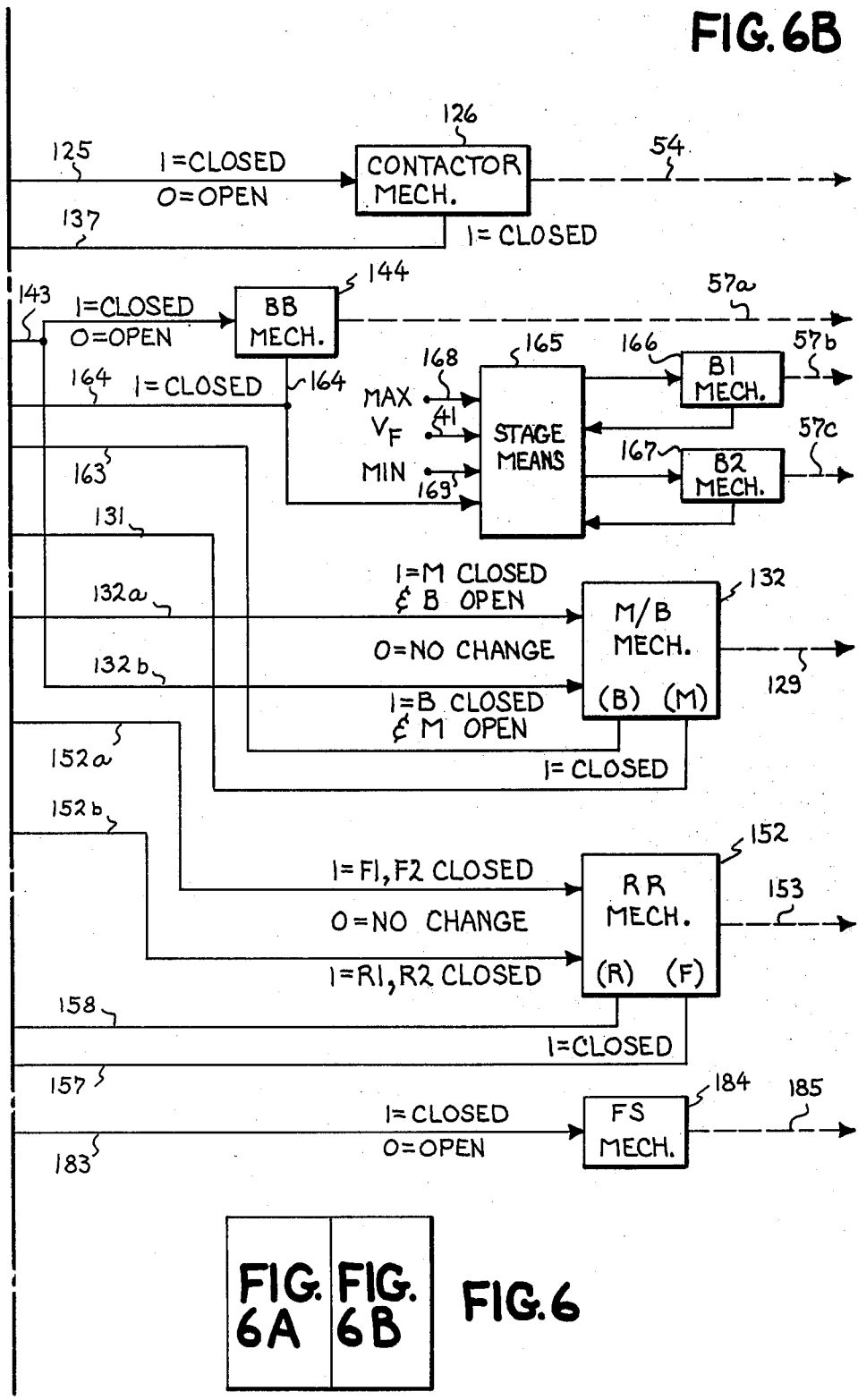

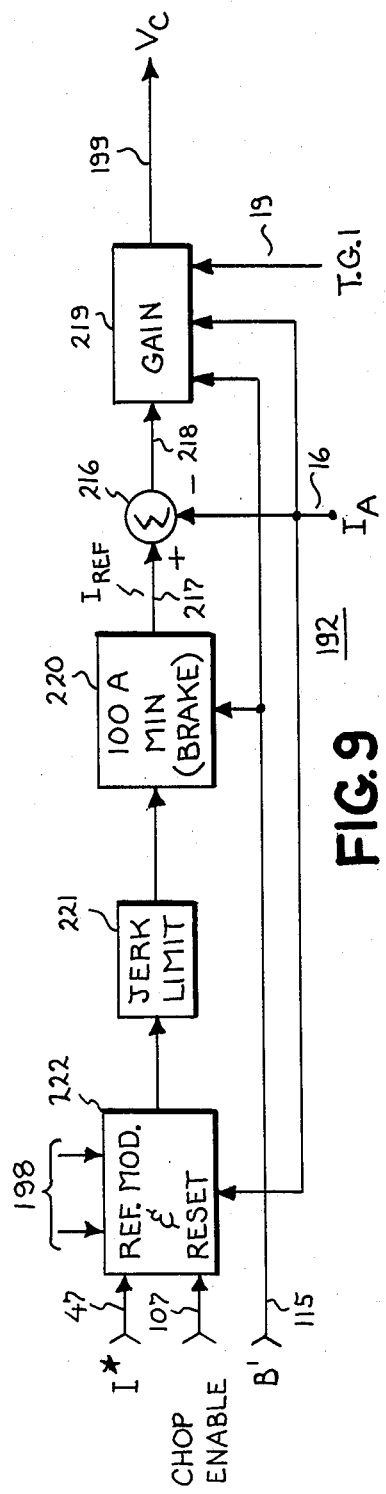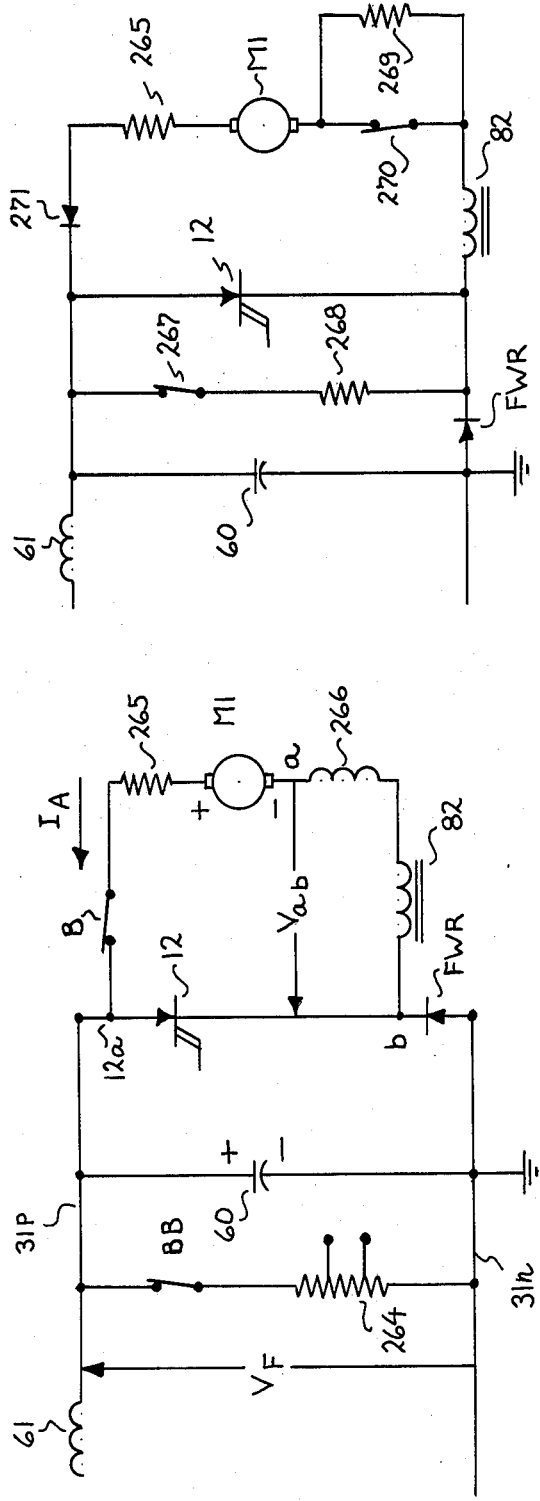

CHOPPER TYPE PROPULSION SYSTEM WITH LOW SPEED ELECTRICAL BRAKING CAPABILITY FOR TRACTION VEHICLES

BACKGROUND OF THE INVENTION

The present invention relates generally to electrical propulsion systems for traction vehicles, and it relates more particularly to means for providing improved electrical braking of a system using electric power choppers to control the magnitude of current in self excited d-c traction motors.

Large electrically driven traction vehicles such as locomotives or transit cars are propelled by a plurality of traction motors mechanically coupled to the respective wheel sets of the vehicle. Such motors are usually of the direct current (d-c) type. A d-c traction motor comprises a stator, a rotor, armature windings on the rotor, and field windings (either connected in series with the armature or separately excited) on the stator. In order to control its tractive effort, there is associated with the motor suitable means for regulating the magnitude of direct current in the motor armature. Electric power apparatus commonly known as a chopper is an energy conserving means for regulating armature current.

A chopper is essentially a controlled switch connected in circuit with the motor armature to meter current from a source of relatively constant d-c electric power to the motor. The switch is cyclically operated between open and closed states, and by appropriately controlling the timing of the successive transitions between these alternate states the magnitude of armature current can be varied or maintained substantially constant as desired. Assuming the chopper is in series with the motor and the propulsion system is operating in its motoring mode, during closed periods of the chopper the motor armature windings will be connected to the d-c power source through a path of negligible resistance, whereby virtually the full magnitude of the source voltage is applied to the motor armature and the current tends to increase. During the open periods of the chopper, the motor is disconnected from the power source and armature current, circulating through a free wheeling path, decays from the magnitude previously attained. In this manner, pulses of voltage are periodically applied to the motor, and an average magnitude of motor current (and hence torque) is established. The rate of change of current is limited by the circuit inductance.

The ratio of the closed time ($t_{ON}$) of the chopper to the sum of the closed and open times ($t_{ON}+t_{OFF}$) during each cycle of operation is the duty factor of the chopper. For a 0.5 duty factor, the repetitive closed and open periods of the chopper are equal to each other, and the width of each voltage pulse has the same duration as the space between successive pulses. In practice, so long as the chopper frequency is relatively high (such as, for example, 300 Hz) the circuit inductance (including the inductance provided by the armature windings of the traction motor itself) will smooth the undulating current in the motor armature sufficiently to prevent untoward torque pulsations, whereby the vehicle is propelled without any uncomfortable amount of jerking or lurching. By varying the duty factor of the chopper, the average chopper output voltage (as a percentage of the d-c source voltage) and consequently the average magnitude of current can be increased or decreased as desired. This is popularly known as time ratio control or pulse control.

A propulsion system using choppers can be adapted for electrical braking by reconnecting the power circuits so that each chopper is connected to the d-c power source in parallel rather than in series with its associated motor. In the braking mode of operation, a traction motor behaves as a generator, and the magnitude of its generated voltage (electromotive force) is proportional to speed and field excitation. The excitation of a series field machine is a function of the magnitude of armature current. With the chopper reconnected in parallel with the motor, during its closed periods the chopper provides a low resistance path for armature current which therefore tends to increase, whereas during its open periods the armature current path includes the power source and the free wheeling path, whereby current tends to decrease. The electric power output of the motor is either fed back to the source (regenerated), or dissipated in a dynamic braking resistor grid that can be connected in parallel with the chopper, or a combination of both. In either case, the average magnitude of armature current (and hence braking effort) can be controlled as desired by varying the duty factor of the chopper.

In the present state of the art, choppers for traction vehicle applications use high-power, solid-state controllable switching devices known as thyristors or silicon controlled rectifiers (SCRs). A thyristor is typically a three-electrode device having an anode, a cathode, and a control or gate terminal. When its anode and cathode are externally connected in series with an electric power load and a source of forward anode voltage (i.e., anode potential is positive with respect to cathode), a thyristor will ordinarily block appreciable load current until a firing signal is applied to the control terminal, whereupon it switches from its blocking or "off" state to a conducting or "on" state in which the ohmic value of the anode-to-cathode resistance is very low. Once triggered in this manner and latched in by conducting load current of at least a predetermined minimum magnitude prior to removal of the firing signal, the thyristor can be turned off only by reducing the current through the device to zero and then applying a reverse voltage across the anode and cathode for a time period sufficient to allow the thyristor to regain its forward blocking ability. Such a device forms the main load-current-carrying switching element of the chopper, and suitable means is provided for periodically turning it on and off.

In practical applications the main thyristor of the chopper is periodically turned off by means of a "commutation" circuit connected in parallel therewith. A typical commutation circuit is a "ringing" circuit, i.e., the circuit contains inductive and capacitive components that develop an oscillating or ringing current. A chopper commutation circuit may include, for example, a precharged capacitor, an inductor, a diode, and the inverse parallel combination of another diode and an auxiliary thyristor. In a voltage turn-off type of chopper, these components of the commutation circuit are so interconnected and arranged so as to divert load current from the main thyristor in response to turning on the auxiliary thyristor, and the main thyristor current is soon reduced to zero. The ringing action of the commutation circuit temporarily reverse biases the main thyristor which is consequently turned off, and during the reverse bias interval the current in the auxiliary thyristor oscillates to zero so that the latter component will also be turned off. For an ensuing brief interval, load current will continue to flow through the capacitor and a series diode in the commutation circuit of the chopper, thereby recharging the capacitor from the d-c source to complete the commutation process. Now the chopper is in an open or non-conducting state, and it cannot return to its closed or conducting state until the main thyristor is subsequently turned on by applying another firing signal.

The duty factor or percentage on time of the chopper is determined by the time delay between firing the auxiliary thyristor and subsequently firing the main thyristor during any full cycle of operation. The shorter this delay, the higher the duty factor, whereas the longer this delay, the lower the duty factor. Practical limits are imposed by the nature of the switching devices used in the chopper. For example, the maximum duty factor is approximately 0.91 for a chopper using a main thyristor rated 1100 amps (average) and 2000 volts (peak forward voltage) and operating at a constant frequency of approximately 300 Hz. A higher duty factor cannot be safely obtained at that chopping frequency because the aforementioned time delay must be at least 300 microseconds to make sure that the main thyristor is not refired prematurely, i.e., before the auxiliary thyristor has time to be completely turned off during the commutation process. For the same assumed parameters, the minimum duty factor would be approximately 0.09. This is because the minimum pulse width per cycle is determined by the recharging time of the capacitor in the oscillatory commutation circuit. Consequently, so long as it is being operated in a constant frequency variable pulse width mode, the chopper is effective to control motor current only in a limited range between its predetermined minimum and maximum duty factors.

It is generally desirable to be able to vary the chopper duty factor over substantially the full range between 0 and 1.0. In U.S. Pat. No. 3,944,856, a constant frequency oscillator ordinarily determines the free running frequency of the chopper, but at high motor speeds a pair of frequency dividers are combined with appropriate logic components to effect a two-step reduced frequency, maximum pulse width mode of operation, thereby extending the range of duty factor variations above the maximum attainable when the chopper is operated in its constant high frequency, variable pulse width mode. At the lower chopping frequencies the minimum delay time required after turning on the auxiliary thyristor before refiring the main thyristor is a smaller fraction of the whole period of each cycle. By thus increasing the duty factor, the percentage of the available d-c source voltage that the chopper can apply to the motor armature is desirably increased. In the referenced patent the chopper frequency is reduced in two discrete steps that are just equal, respectively, to one-third and one-half of the constant high frequency, and this technique is not optimum for controlling armature current during low speed electrical braking of a chopper type propulsion system on a large traction vehicle.

Smooth continuous variations of the duty factor up to 1.0 are desirable during the braking mode of operation to obtain high, constant braking effort when the vehicle is traveling at low speeds. The higher the duty factor, the lower the minimum speed at which the maximum magnitude of armature current can be sustained during braking. Once the vehicle decelerates below this minimum speed, braking effort will decrease or fade out. The lowest possible minimum brake fade out speed is generally desirable.

Before changing from motoring to braking modes of operation, it is good practice to reduce the chopper duty factor to zero so that there is no current in the armature of the motor at the time the propulsion system is reconnected for braking operation. If the vehicle were moving slowly when the motoring-to-braking transition is desired, it would be difficult to turn on the chopper after the transition. This is because at low speeds the voltage generated by the motor is low, especially in a series fluid motor with zero current. The low voltage may be insufficient to forward bias the main thyristor in the chopper. Even if the main thyristor were successfully triggered, a relatively long time is required for current to build up to an appreciable level in the armature current path, and there is a possibility that latching current will not be attained during the period of the firing signal that is normally applied. Raising the voltage of the motor by using the prior art technique of boosting its field at the beginning of a braking mode of operation is helpful but does not completely solve the problem. Lengthening the period of the normal firing signals is not a desirable solution because of the attendant energy loss and isolation problems. Shunting the free wheeling path with an inversely poled auxiliary thyristor that temporarily conducts current from the d-c source for augmenting current flowing through the main thyristor when initially triggered, as suggested in prior art U.S. Pat. No. 3,748,560, is not a practical solution.

SUMMARY OF THE INVENTION

Accordingly, it is a general objective of the present invention to provide a chopper type of d-c traction motor propulsion system wherein the duty factor of the chopper is smoothly variable over a wide range extending to a maximum of 1.0.

Another objective of this invention is the provision of a traction vehicle propulsion system that is characterized, when operating in its braking mode, by an unusually low minimum brake fade out speed.

A further object of the invention is to provide a propulsion system characterized, when operating in its braking mode, by smooth, constant, relatively high braking effort as the traction motors decelerate to a low brake fade out speed.

Yet another objective is the provision of improved means for effecting electrical braking of a chopper type of d-c traction motor propulsion system wherein initial turn on of the chopper at the beginning of the braking mode of operation can be obtained at relatively low speeds.

In carrying out our invention in one form, a propulsion system having motoring and braking modes of operation includes a chopper and means effective when the system is operating in its motoring mode for connecting the chopper, in series with the armature and field windings of a d-c traction motor, to a d-c electric power source that includes a filter capacitor. In normal operation, the chopper is alternately turned on and off in response to periodic gating signals of short duration that are produced by cyclically operative means. During the off intervals of the chopper, current in the armature of the motor circulates through free wheeling rectifier means that is connected in circuit therewith. Upon commanding a motoring-to-braking transition, brake set up means is operative for reconnecting the propulsion system to establish an armature current path comprising the field winding in series with first and second parallel branches, the first branch including the chopper and the second branch including the filter capacitor in series with the free wheeling rectifier means. At the same time the polarity of the connection of the series field winding relative to the armature is reversed.

In one aspect of the invention, we provide burst firing means effective in response to the reconnecting operation of the brake set up means for supplying an extended chopper turn on signal having a duration substantially longer than the aforesaid short duration of the normal gating signals, thereby ensuring that the chopper turns on and conducts armature current to begin the braking mode of operation of the propulsion system. In another aspect of the invention, the gating signal producing means is controlled by a variable control signal whose value determines the duty factor of the chopper, and it is arranged so that for control signal variations within a predetermined range, the gating signals are produced at a predetermined constant frequency while the off time of the chopper is gradually decreased toward a predetermined minimum as the value of the control signal approaches a high end of that range, whereas for control signal variations beyond the high end of the aforesaid range the gating signals are produced at an average frequency that decreases from the predetermined constant frequency to zero as the value of the control signal increases while maintaining the predetermined minimum off time. As a result, smooth variation of the chopper duty factor up to 1.0 is obtained.

The invention will be better understood and its various objects and advantages will be more fully appreciated from the following description taken in conjunction with the accompanying drawings.

BRIEF DESCRIPTION OF THE DRAWINGS

FIG. 6 shows the interrelationship of FIGS. 6A and 6B;

FIGS. 6A and 6B are schematic diagrams of the logic and contactor actuating mechanisms in the brake control block of FIG. 5;

FIG. 9 is a schematic diagram of the chopper reference block of FIG. 5;

FIG. 12 is a simplified schematic circuit diagram of the armature current path of the illustrated system after being reconnected for electrical braking operation;

FIG. 13 is a diagram similar to FIG. 12 but showing an alternative propulsion system;

DESCRIPTION OF THE PREFERRED EMBODIMENT

FIG. 1

Figure 1:
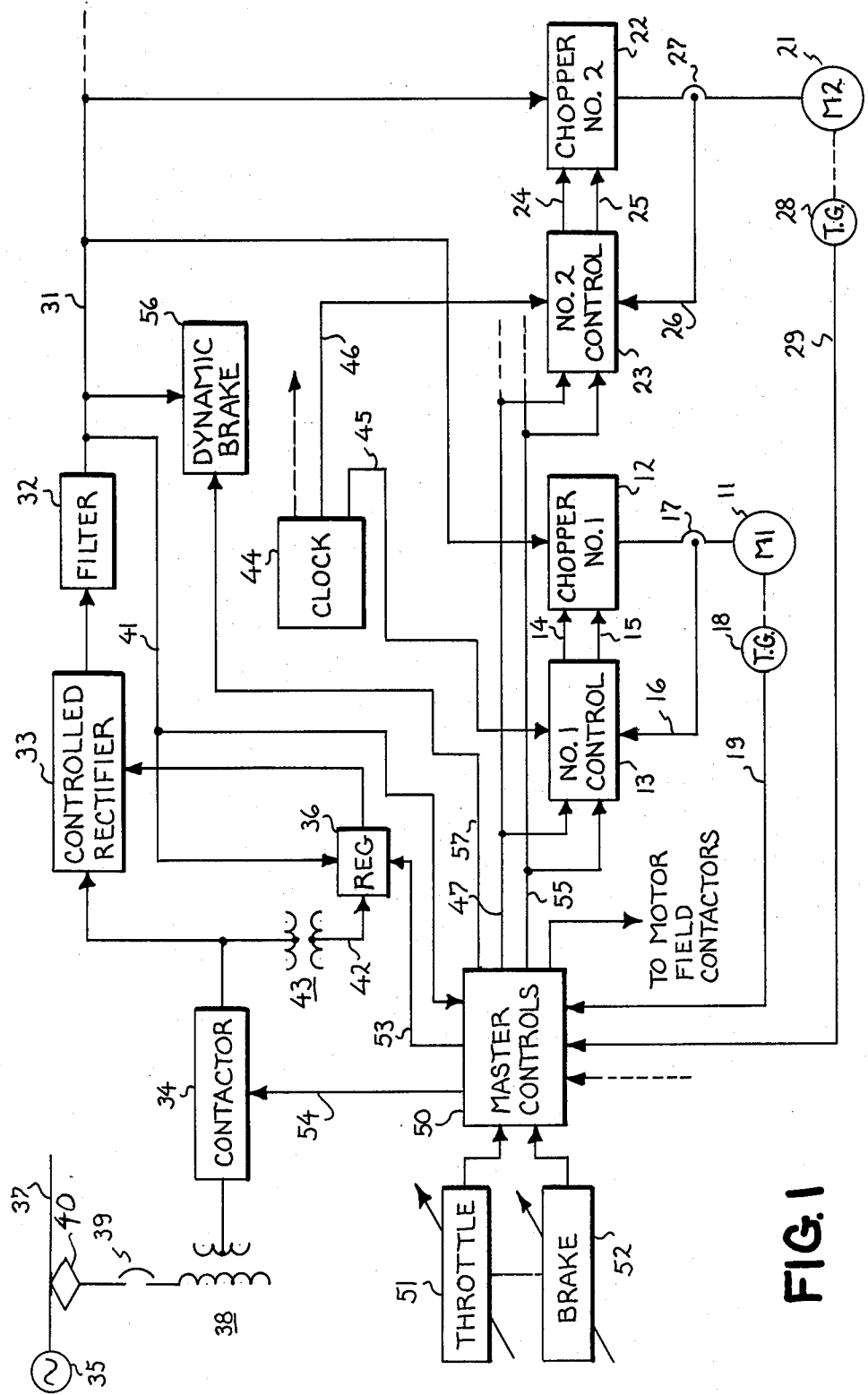
FIG. 1 is a functional block diagram of a traction vehicle propulsion system having a plurality of chopper/motor units connected in parallel to a d-c bus.

FIG. 1 depicts a propulsion system comprising at least two d-c traction motors 11 and 21 suitable for propelling or retarding a large traction vehicle such as a locomotive or transit car. The motors 11 and 21 are shown symbolically in FIG. 1 and are respectively labeled "M1" and "M2". It will be understood that each motor has conventional armature and series field windings (see FIG. 3). The motor rotors are mechanically coupled by speed reducing gears to separate wheel sets of the vehicle (not shown), and the armature windings of the motors M1 and M2 are electrically connected via duplicate electric power choppers 12 and 22, respectively, to a common d-c power bus 31. Persons skilled in the art will be aware that additional chopper/motor units can be readily connected to the bus 31 in parallel with the two units that are illustrated in FIG. 1. The d-c bus 31 is coupled to a suitable source of d-c electric power. Conventional filtering means 32, including a shunt capacitor (see FIG. 2), is connected between bus and source for isolation purposes and to provide a bypass of the source for high-frequency, chopper generated currents.

Preferably the d-c power source for the propulsion system includes a controllable electric power converter 33, means including a contactor 34 for connecting the input of the converter 33 to a source 35 of relatively constant voltage, and regulating means 36 effective when the propulsion system is operating in a motoring mode for controlling the converter 33 so as to limit the average magnitude of voltage across the shunt capacitor in the filter 32 to a predetermined level (e.g., 1750 volts) during light load conditions when the capacitor voltage would otherwise tend to rise higher. In the illustrated embodiment of the invention, the voltage source 35 is stationary and feeds alternating voltage of relatively high magnitude and commercial power frequency to an alternating current (a-c) line 37 comprising a catenary or third rail located along the wayside of the traction vehicle. The magnitude of the a-c line voltage may be, for example, 25,000 volts rms, and the frequency may be 60, 50 or 25 Hz. Onboard the vehicle there is a power transformer 38 to step down this voltage. The primary winding of the power transformer 38 is connected by way of a high voltage circuit breaker 39 to a current collector 40 (e.g., a pantograph) that makes sliding contact with the wayside line 37. The secondary winding of the transformer 38 is connected by way of separable contacts of the contactor 34 to a set of a-c input terminals of the converter 33.

Preferably the converter 33 is a phase-controlled rectifier circuit utilizing controllable solid state electric valves such as thyristors or silicon controlled rectifiers in selected legs of a full-wave bridge rectifier configuration, and the associated regulating means 36 is constructed and arranged in accordance with the teachings of U.S. Pat. No. 4,152,758 issued May 1, 1979, on a patent application Ser. No. 836,457 filed for R. B. Bailey, T. D. Stitt, and D. F. Williamson, on Sept. 26, 1977, and assigned to the General Electric Company, which patent is expressly incorporated herein by reference. As is indicated in FIG. 1, a capacitor voltage feedback signal is supplied from the d-c bus 31 to the regulating means 36 on a line 41, and an alternating voltage feedback signal is supplied to the regulating means 36 on a line 42 which is coupled through a potential transformer 43 to the input terminals of the controlled rectifier circuit 33.

In order to meter the current in the armatures of the motors M1 and M2 that are connected in parallel array to the d-c bus 31, each of the respective choppers 12 and 22 is alternately turned on (closed) and turned off (opened). For the first chopper 12 this pulsing type of operation is controlled by an associated No. 1 control means 13 which normally supplies chopper No. 1 with alternate turn on and turn off signals on lines 14 and 15, respectively, and the second chopper 22 is controlled by a similar No. 2 control means 23 which normally supplies it with alternate turn on and turn off signals on lines 24 and 25, respectively. The chopper turn on and turn off signals are synchronized with a train of discrete clock pulses that are generated at a constant high frequency (e.g., 300 Hz) by a master clock 44. The clock 44 is connected to the control means 13 and 23 by lines 45 and 46, respectively. The clock pulses supplied on line 46 to the No. 2 control means 23 are phase shifted or staggered with respect to the clock pulses that are supplied on line 45 to the No. 1 control means 13, whereby the two or more choppers used in the illustrated propulsion system have their respective turned-off periods sequentially initiated at substantially equally spaced intervals during each cycle of operation. By operating the choppers in sequence rather than in unison, the amplitude of ripple current in the filtering means 32 and the rms current in the filter capacitor are desirably reduced, thereby minimizing the size of the filtering components that are required to provide a desired degree of electrical isolation between the choppers and the wayside power line 37.

Figure 10:
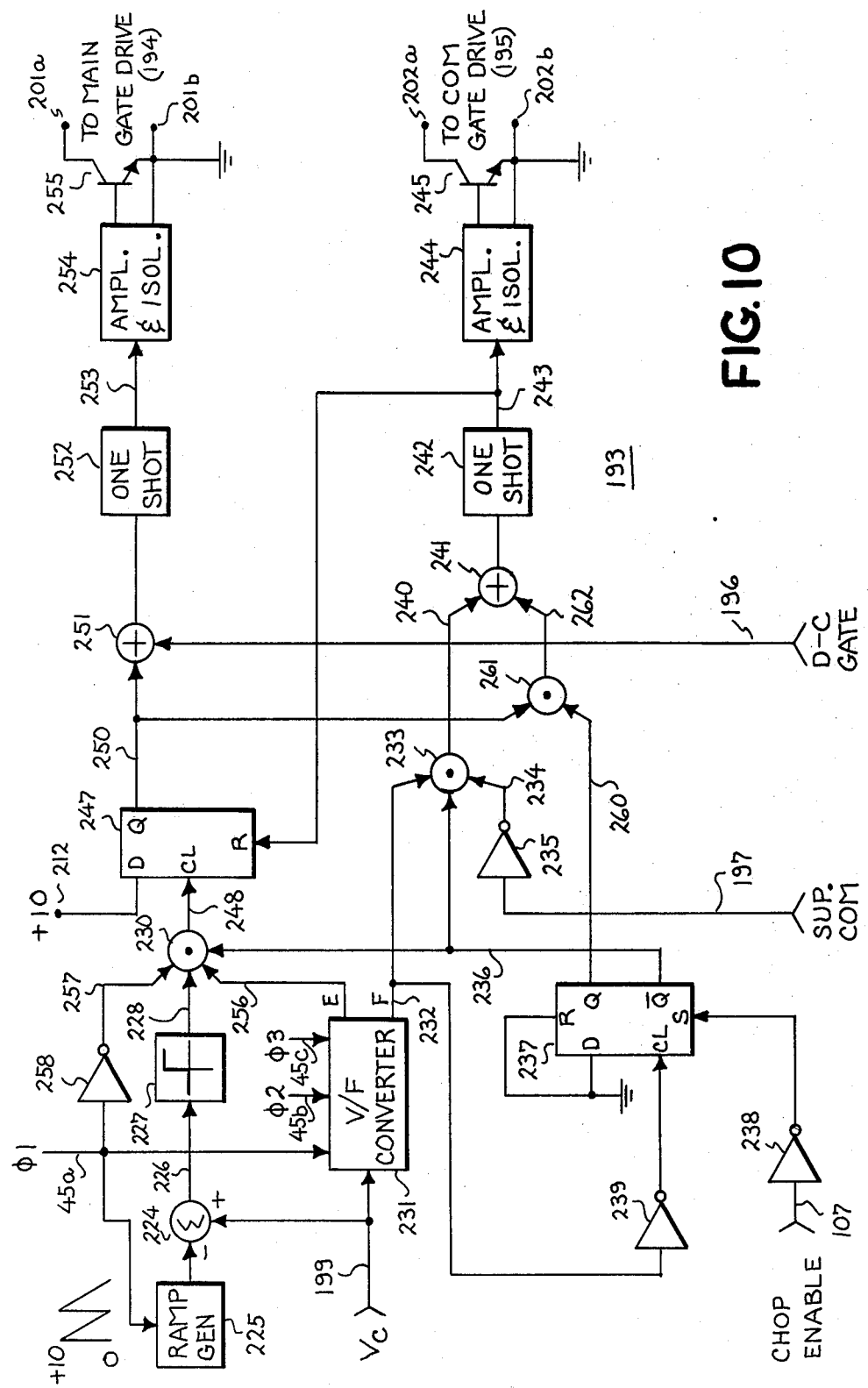
FIG. 10 is a schematic diagram of the chopper pulses block of FIG. 5.

In each of the motors M1 and M2 the average magnitude of armature current (and hence motor torque) will depend on the duty factor of the associated chopper. As will soon be explained in more detail, each of the control means 13 and 23 is arranged to vary the duty factor as necessary to minimize any difference between a current feedback signal and a current reference signal. To provide current feedback signals, conventional current transducers 17 and 27 in the armature current paths of the respective motors M1 and M2 are connected via lines 16 and 26 to the control means 13 and 23, respectively. The current reference signal in each control means is derived from a current call signal received on line 47 from a master controls block 50. In accordance with one aspect of the present invention, the chopper control means 13 (and 23) has the capability of smoothly varying the duty factor of the chopper 12 (and 22) over a continuum that extends all the way between zero at one extreme (chopper turned off continuously) and 1.0 at the opposite extreme (chopper turned on continuously). This will be more apparent hereinafter when FIG. 10 is described.

The master controls 50, shown as only a single block in FIG. 1, perform several functions that will now be briefly summarized. The construction and operation of these controls will hereinafter be explained in more detail in connection with the description of FIGS. 5 and 6. One function of the master controls is to provide the aforesaid current call signal on output line 47. The value of this signal is varied as a function of the setting of either a manually operated throttle 51 or a manually operated brake controller 52, which is mechanically interlocked with the throttle, and it is also a function of the speed of the vehicle. The vehicle speed is indicated by speed sensing means 18 and 28 which are respectively coupled to the wheel sets of the vehicle or to the armatures of the motors M1 and M2. These speed sensing means typically are tachometer generators, and they feed back to the master controls 50 on lines 19 and 29 signals representative of the angular velocities of the armatures of the respective motors.

Another function of the master controls 50 is to provide a voltage reference signal for the regulating means 36 that controls the phase-controlled rectifier circuit 33 in the d-c electric power source of the illustrated propulsion system. This signal is supplied over a line 53 from the master controls to the regulator 36. Its value, which is set in the master controls, determines the limit level of voltage across the shunt capacitor in the filter 32.

Figure 3:
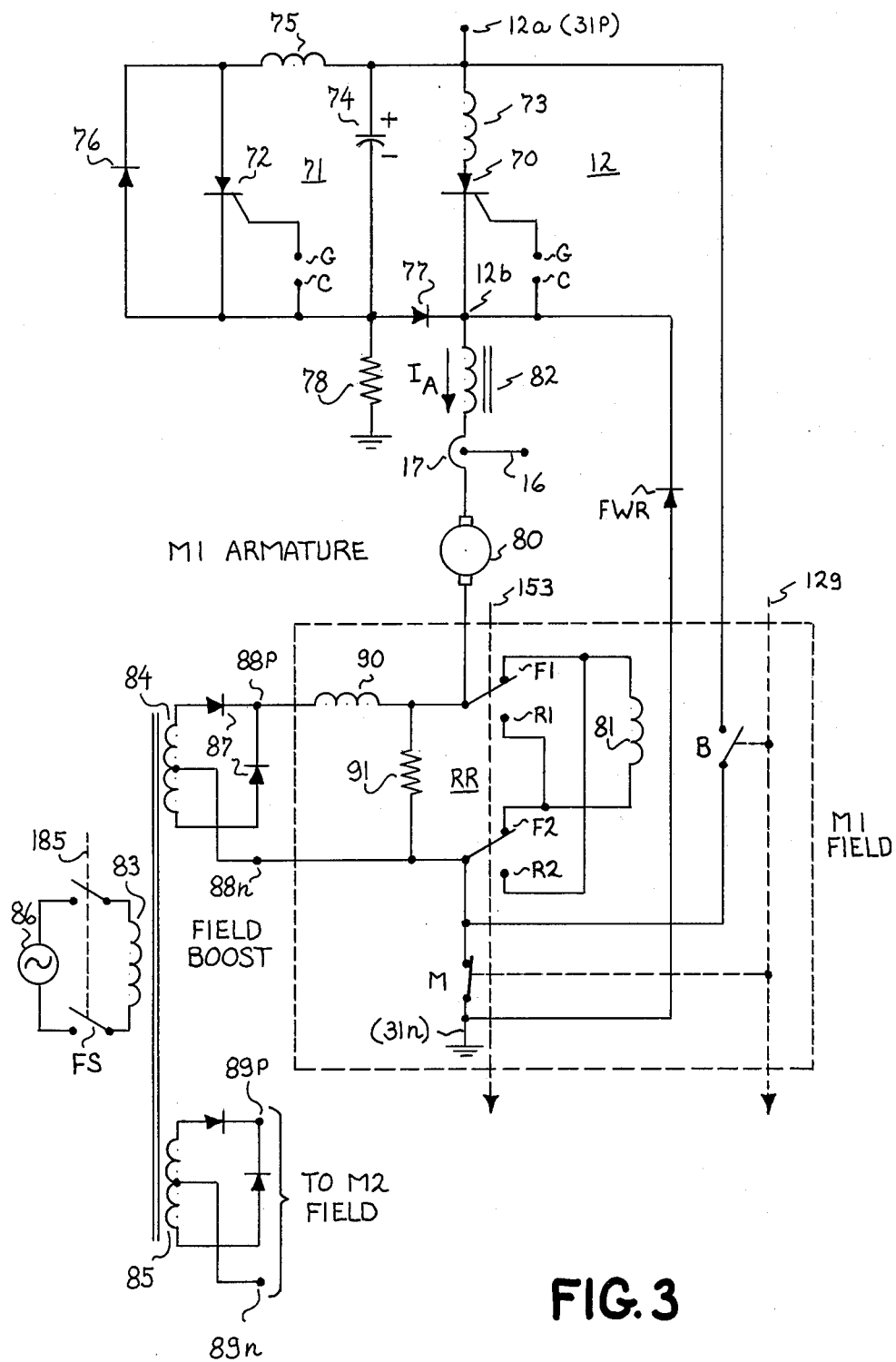
FIG. 3 is a schematic circuit diagram of a chopper/motor unit shown symbolically in FIG. 1.

A third function of the master controls 50 is to carry out an orderly transition of the propulsion system between its motoring and braking modes on command. This entails actuating the contactor 34 that connects the input terminals of the controlled rectifier circuit 33 to the secondary windings of the power transformer 38, and accordingly the master controls are shown connected to the contactor 34 by a line 54. It also entails actuating certain additional contactors and a reverser in the armature and field circuits of the motors 11 and 21. These additional contactors and the reverser for the first motor 11 are shown in FIG. 3 which will soon be described.

In accordance with a second aspect of the present invention, at the start of a braking mode of operation the master controls 50 will momentarily boost the motor fields and will supply a burst firing signal on line 55 to the chopper control means 13 and 23. The burst firing signal causes each of the control means 13 and 23 to supply an extended turn on signal to its associated chopper, thereby ensuring that the chopper in fact turns on while the field is being boosted.

When the illustrated propulsion system is operating in its braking mode, electric energy from the motors M1 and M2 (now behaving as generators) is dissipated in a resistor grid that needs to be connected to the d-c power bus 31 for this purpose. The braking resistor grid is represented in FIG. 1 by a block 56 labeled "Dynamic Brake," and the master controls 50 are connected to this block by a line 57 in order to actuate a contactor that will connect certain resistors in the grid in parallel circuit relationship with the shunt capacitor in the filter 32 in response to a transition from motoring to braking modes of operation. It should be noted that a single dynamic brake 56 is shared by all of the chopper/motor units that are connected in parallel to the d-c bus 31. There is also provided in the master controls means effective during braking for actuating additional "staging" contactors in the dynamic brake block 56 for changing, in three discrete steps the amount of resistance connected to the d-c bus as necessary to prevent the generated energy from charging the filter capacitor to an unacceptably high level of voltage.

FIG. 2

The dynamic brake block 56 and the filtering means 32 of the propulsion system have been shown in more detail in FIG. 2 which will now be described. The d-c power bus 31, shown as one line in FIG. 1, is actually a pair of conductors 31p and 31n which are respectively connected via the filtering means 32 to a pair of d-c output terminals 33p and 33n of the phase-controlled rectifier circuit 33. The terminal 33n and the conductor 31n are both at ground potential, and a potential that is positive with respect to ground is developed on the terminal 33p and on the conductor 31p. The positive conductor of the d-c bus is connected to ungrounded power terminals 12a and 22a of the respective choppers 12 and 22.

Figure 2:
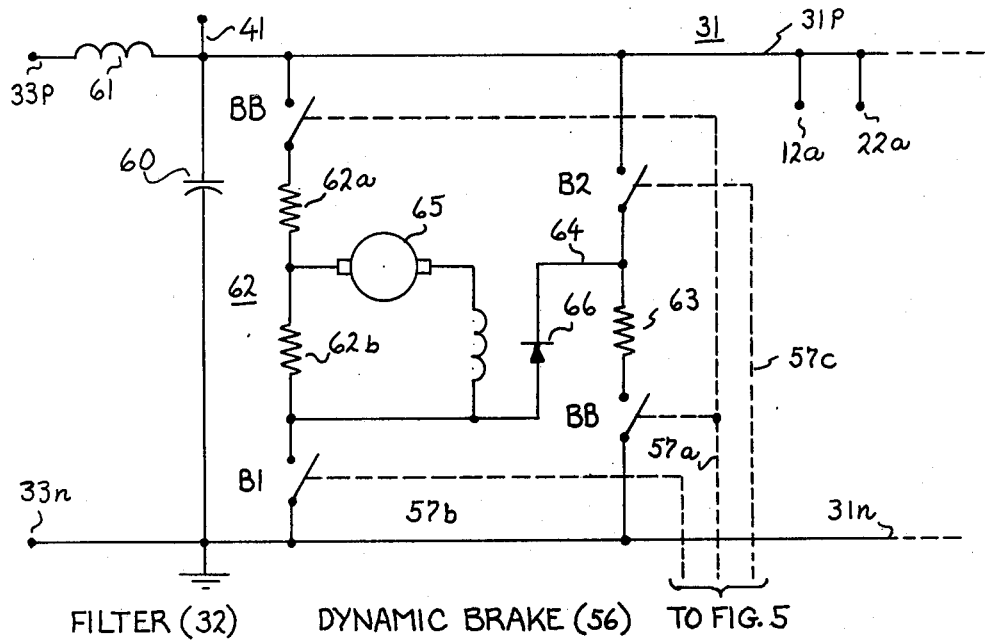
FIG. 2 is a schematic circuit diagram of the filter and dynamic brake shown as single blocks in FIG. 1.

As is shown in FIG. 2, the filtering means 32 comprises a voltage smoothing capacitor 60 connected between the conductors 31p and 31n and a current limiting inductor 61 connected between the positive conductor 31p and the corresponding source terminal 33p. Although the filter capacitor 60 is illustrated and referred to in the singular, in practice this component will usually comprise a bank of parallel capacitor elements. The capacitor 60 provides a current path for any instantaneous difference between source current and total load current during the motoring operation of the propulsion system, thereby attenuating both line-frequency ripple and chopper-generated harmonics. For this purpose a filter capacitor having a capacitance value of 6000 microfarads is contemplated in one practical application of the invention. The inductor 61 can have an inductance value of the order of 6 millihenrys. The capacitor voltage feedback signal line 41 is connected to the positive conductor 31p of the d-c bus 31.

As can be seen in FIG. 2, the dynamic brake resistor grid 56 preferably comprises two resistors 62 and 63. These resistors have nearly equal ohmic values, with resistor 62 being divided into two serial elements 62a and 62b. One pole of a normally open two-pole contactor BB is connected between the upper end of the resistance means 62 and positive conductor 31p of the d-c bus, a conducting path 64 is connected between the lower end of the resistance means 62 and the upper end of the resistor 63, and the second pole of the contactor BB is connected between the lower end of the resistor 63 and the grounded conductor 31n, whereby all of the resistor elements 62a, 62b and 63 are connected in series with one another across the d-c bus 31 when the contactor BB is actuated to its closed position. A d-c motor 65 that drives a blower (not shown) for forcing cooling air across the resistor grid is connected in parallel with the element 62b of the resistance means 62 for energization by the voltage drop across this element when conducting current. If and when an approximately 50 percent reduction in the amount of resistance across the d-c bus is desired, a first staging contactor B1 can be closed to connect the lower end of the resistance means 62 to the grounded conductor 31n of the d-c bus, thereby short circuiting resistor 63. Thereafter, if and when another similar decrement in resistance is desired, a second staging contactor B2 can be closed to connect the upper end of resistor 63 to the positive conductor 31p. A diode 66 in the path 64 is reverse biased when both of the staging contactors are closed so that no current can flow in the path 64, and now the resistors 62 and 63 are effectively connected in parallel with each other across the d-c bus. The contactor BB, B1, and B2 are coupled by broken lines 57a, 57b and 57c, respectively, to brake control means shown in FIG. 5. Their opened and closed positions are respectively determined by the brake control means, and the mechanisms for activating these contactors are shown in more detail in FIG. 6B. The operation of the staging contactors B1 and B2 to prevent the braking energy from overcharging the filter capacitor 60 will be explained in connection with the description of FIG. 6.

FIG. 3

Turning next to FIG. 3, a preferred embodiment of the first chopper 12 will now be described. The illustrated chopper is of the type disclosed in U.S. Pat. No. 4,017,777 issued on Apr. 12, 1977, to R. B. Bailey and assigned to the General Electric Company. In brief, it comprises a main thyristor 70, an oscillatory commutation circuit 71 connected across the main thyristor, and an auxiliary or commutating thyristor 72 in the commutation circuit. The main thyristor 70 is connected between the power terminals 12a and 12b of the chopper, with a commutating inductor 73 being disposed between its anode and the terminal 12a. As was previously mentioned, the anode terminal 12a of the chopper 12 is connected directly to the positive conductor 31p of the d-c power bus 31.

The commutation circuit 71 of the chopper includes, in addition to the thyristor 72, a commutating capacitor 74, an inductor 75, and a diode 76. The positive plate of the capacitor 74 is connected directly to the terminal 12a, and the negative plate of this capacitor is connected to the terminal 12b through a diode 77 that is poled to block capacitor discharge current when the main thyristor 70 is turned on. The auxiliary thyristor 72 is connected across the commutating capacitor 74, with the inductor 75 being connected between its anode and the positive plate of the capacitor. The commutating thyristor 72 is shunted by the inversely poled diode 76, and its cathode is connected through a resistor 78 to ground. The gate or control electrode and the cathode of each of the thyristors 70 and 72 are connected to gate and cathode terminals G and C, respectively. While each of the thyristors 70 and 72 and each of the diodes 76 and 77 has been shown in FIG. 3 as a single element, it will be understood that in practice, if required in choppers having high voltage and/or current ratings, additional elements of like kind could be connected in series and/or parallel with the illustrated elements and operated in unison therewith.

Normally the chopper 12 is turned on by firing the main thyristor 70. This is done by applying a discrete signal of appropriate magnitude and duration across its gate and cathode terminals. With the main thyristor 70 turned on and the commutating capacitor 74 charged, the diode 77 is reverse biased and there is no current in the commutation circuit 71. Subsequently the commutating thyristor 72 is fired by applying across its gate and cathode terminals a discrete chopper turn off signal of appropriate magnitude and duration. Now the commutating capacitor 74 will discharge through the inductor 75. The resulting ringing action of the commutation circuit 71 soon forward biases the diode 77, whereupon current in the main thyristor 70 is reduced to zero and the main thyristor is temporarily reverse biased. This turns off the main thyristor 70. During the reverse bias interval the current in the commutation circuit 71 oscillates to zero and reverses direction. While current is flowing through the diode 76, the commutating thyristor 72 is reverse biased and consequently turned off. For an ensuing brief interval, current continues to flow through the commutating capacitor 74 and the diode 77, thereby recharging the capacitor from the d-c source to complete the commutation process. Now the chopper is turned off, and it will remain in this state until the main thyristor 70 is refired by the next turn on signal.

So long as the propulsion system is operating in its motoring mode, the chopper 12 is periodically turned on and off to regulate the average magnitude of current flowing from the d-c power source to the armature and series field windings of the associated motor M1. In FIG. 3 the armature of this motor is shown at 80, and the series field winding is shown at 81. The chopper 12, the armature 80, and the field 81 are connected in series with one another between the terminal 12a and ground, and this series combination of components is therefore connected across the filter capacitor 60 (FIG. 2). As is shown in FIG. 3, the means for serially interconnecting these components includes a current smoothing reactor 82 and the current transducer 17, both of which are connected between the cathode terminal 12b of the chopper and the armature 80, and a contactor M which connects the series field 81 to ground. The contactor M is closed (as shown) during the motoring mode of operation and is open during the braking mode of operation. The interconnecting means also includes a reverser RR that determines the polarity of the connection of the series field winding 81 relative to the armature 80.

The reverser RR is illustrated as a double-pole double-throw contactor. When this reverser is in a first position, the movable contact comprising one of its poles engages a stationary contact F1 and the movable contact comprising its other pole engages a stationary contact F2, whereas when the reverser is in a second, alternative position, the first-mentioned movable contact engages a stationary contact R1 which is connected to contact F2, and the other movable contact engages a stationary contact R2 which is connected to contact F1. Either the armature 80 or the series field winding 81 can be connected between the contacts F1 and F2. In the illustrated embodiment of the invention, it is the field winding 81 that is so connected.

During intervals when the chopper 12 is turned off, armature current $I_A$ in the motor M1 is conducted by free wheeling rectifier means FWR which is connected in circuit with the armature 80 and field 81. In FIG. 3 the free wheeling rectifier means is shown as a simple diode having its anode connected to ground and its cathode connected to the cathode terminal 12b of the chopper 12. Whenever this element is conducting current, terminal 12b is at nearly ground potential. If desired, the free wheeling rectifier means FWR can comprise a thyristor instead of the illustrated diode. If a thyristor were used, its firing can be controlled by the improved gate means described and claimed in copending patent application Ser. No. 973,973 filed for R. B. Bailey on Dec. 28, 1978, and assigned to the General Electric Company.

To change from motoring to braking modes of operation, the contactor M is opened and a companion contactor B is closed. As is shown in FIG. 3, the contactor B, when closed, connects the last-mentioned movable contact of the reverser RR to the anode terminal 12a of the chopper 12 (and hence to the positive conductor 31p of the d-c bus 31). Consequently, when the contactor M is actuated to its open position and the contactor B is actuated to its closed position, the propulsion system is reconnected to establish an armature current path comprising the field winding 81 and the contactor B in series with at least two parallel branches. A first one of these parallel branches is provided by the chopper 12, and the second parallel branch is provided by the filter capacitor 60 (FIG. 2) in series with the free wheeling rectifier means FWR. The conducting direction of the free wheeling rectifier means in the second parallel branch enables armature current to charge the filter capacitor 60 when the chopper 12 is turned off but blocks discharge of this capacitor through the chopper when turned on. A third branch paralleling the first and second branches of the armature current path is provided by the resistor grid 62, 63 (FIG. 2) whenever the dynamic brake contactor BB is closed.

During the transition from motoring to braking modes of operation, the reverser RR is actuated so as to reverse the polarity of the connection of the series field winding 81 relative to the armature 80 of the motor M1. With the field 81 connected to the reverser RR as shown in FIG. 3, actuation of the reverser will reverse the direction of current in the field 81 and thereby reverse the polarity of the electromotive force generated in the armature windings 80 during the braking mode of the operation (when the motor M1 is behaving as a generator). As a result, the electromotive force will be applied across the chopper 12 with the proper polarity to forward bias the main thyristor 70. Alternatively, if the reverser RR were connected across the armature 80 instead of the field 81, the polarity of the generated electromotive force would be the same during braking as during motoring but the positive motor brush would be reconnected through the reverser and the contactor B to the anode terminal 12a of the chopper.

The opened and closed positions of the respective contactors M and B and reverser RR in the armature and field circuits of the motor M1 are determined by brake control means (shown in FIG. 5) to which they are coupled by broken lines 129 and 153, and the mechanisms for actuating these components are shown in more detail in FIG. 6B. The same mechanisms can also be coupled, respectively, to similar contactors and to a similar reverser that are connected in the armature and field circuits of the second chopper/motor unit 22/M2, whereby the second unit of the propulsion system is reconnected for braking operation and the polarity of its field is reversed with respect to its armature connection simultaneously with the occurrence of these events in the FIG. 3 chopper motor unit.

FIG. 3 also illustrates means for boosting the fields of the traction motors M1 and M2. This means comprises a transformer having a primary winding 83 and multiple secondary windings 84 and 85, a suitable source 86 of alternating voltage, and a normally open double-pole field boost switch FS connected between the source 86 and the primary winding 83. The voltage across the transformer secondary winding 84 when energized is rectified by a pair of diodes 87 and applied to relatively positive and negative output terminals 88p and 88n. As is shown in FIG. 3, opposite ends of the secondary winding 84 are connected through the respective diodes 87 to the relatively positive terminal 88p, and a center tap of the secondary winding is connected directly to the relatively negative output terminal 88n. A similar rectifier circuit connects the other secondary winding 85 to a second pair of output terminals 89p and 89n.

The first pair of output terminals 88p and 88n of the field boost means are respectively connected to the upper and lower movable contacts of the reverser RR and hence to the associated field winding 81 of the motor M1. A current limiting inductor is serially inserted in this connection, and a resistor 91 is connected in parallel with the field to minimize the effect of chopper-induced ripple on motor commutation. Whenever the switch FS is closed, the transformer primary winding 83 is energized by the source 86 and the field boost means then supplies current of desired magnitude (e.g., 60 amperes) from its output terminals 88p and 88n to the field winding 81. This will increase the field excitation of motor M.

The movable contacts of the field boost switch FS are actuated by a suitable mechanism (shown in FIG. 6B) to which they are coupled via broken line 185. As will be more fully explained hereinafter in connection with the description of FIG. 6, this actuating mechanism is automatically operative to close the switch FS temporarily, for a predetermined period of time (e.g., approximately one second), in response to a motoring-to-braking transition of the propulsion system, whereby a momentary increase of field current is obtained at the beginning of the braking mode of operation. At the same time, the field boost means will also momentarily increase current in the field winding (not shown) of the second motor M2 to which the second pair of output terminals 89p, 89n are connected. The additional excitation during the period of field boost results in more electromotive force being generated by the traction motors, whereby the voltage across the armature of each motor is desirably increased. This armature voltage increase is significant if the braking mode of operation is initiated with the vehicle moving at a relatively low speed. At low speeds without field boost the electromotive force might be insufficient to force current to build up in the armature and series field of the motor.

During the above mentioned period of time that the field boost means is operative to increase field excitation at the beginning of the braking mode of operation, a burst firing signal from the master controls causes the No. 1 chopper control means 13 to apply to the gate terminal of the main thyristor 70 in the chopper 12 an extended firing signal having a duration substantially longer than that of the discrete turn on signals that are periodically supplied by the control means in normal operation. This solves a problem of effecting initial turn on of chopper 12 when electrical braking is initiated at low speeds. Even with the previously described operation of the field boost means, the increased voltage across the armature 80 of the motor M1 is not high enough at low speed (e.g., 3 miles per hour) to force current in the armature current path to increase abruptly as soon as the leading edge of the first firing signal is applied to the gate terminal of the main thyristor 70. The inductance of this path and the appreciable voltage drop across the main thyristor when conducting less than its "latching" current can result in delaying current building up to the minimum latching level for an interval much longer than the duration of one of the normal periodic firing signals. The extended firing signal that is applied during the field boost period in accordance with the present invention has a duration longer than the maximum anticipated time that will be required for armature current to attain the latching level of the thyristor 70, and therefore successful turn on of the chopper is ensured when braking is initiated at low speed.

FIG. 4

Figure 4:
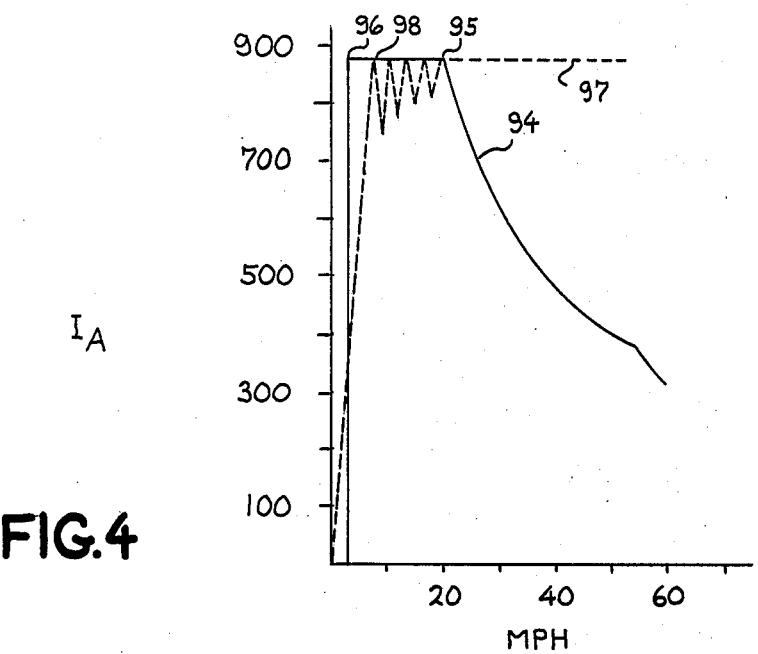
FIG. 4 is a graph showing the armature current vs. speed characteristic of the FIG. 1 propulsion system.

In FIG. 4 the solid-line trace 94 depicts the relationship between the magnitude of armature current $I_A$ and the vehicle speed (MPH) during the braking mode of operation of an electric locomotive embodying the present invention, with the brake control means being set at its maximum (1.0) rate. At speeds above the corner point 95 (approximately 21 MPH), the propulsion system is operating at constant horsepower, whereas at speeds between the corner point 95 and a predetermined minimum point 96 the propulsion system is operating at a constant current and hence constant braking effort. A minimum speed as low as 3 MPH can be obtained in practice. Electrical braking can be successfully initiated at any speed above this low minimum, and the maximum braking rate can be sustained without fadeout as the vehicle decelerates to the minimum point 96. The improved electrical braking performance of the present invention can be appreciated by comparing it with the armature current vs. speed characteristic of a typical prior art electric locomotive during the braking mode of operation. The latter characteristic is shown in FIG. 4 by the broken-line trace 97. Below the corner point speed 95, armature current in the prior art propulsion system tends to fall off linearly with decreasing speed, but the braking range is extended to a minimum point 98 (e.g., 8 MPH) by using staging contactors to reduce the ohmic value of the braking grid resistors in four discrete steps. Below the minimum speed point 98 the braking effort of the prior art propulsion system fades out.

Figure 5:
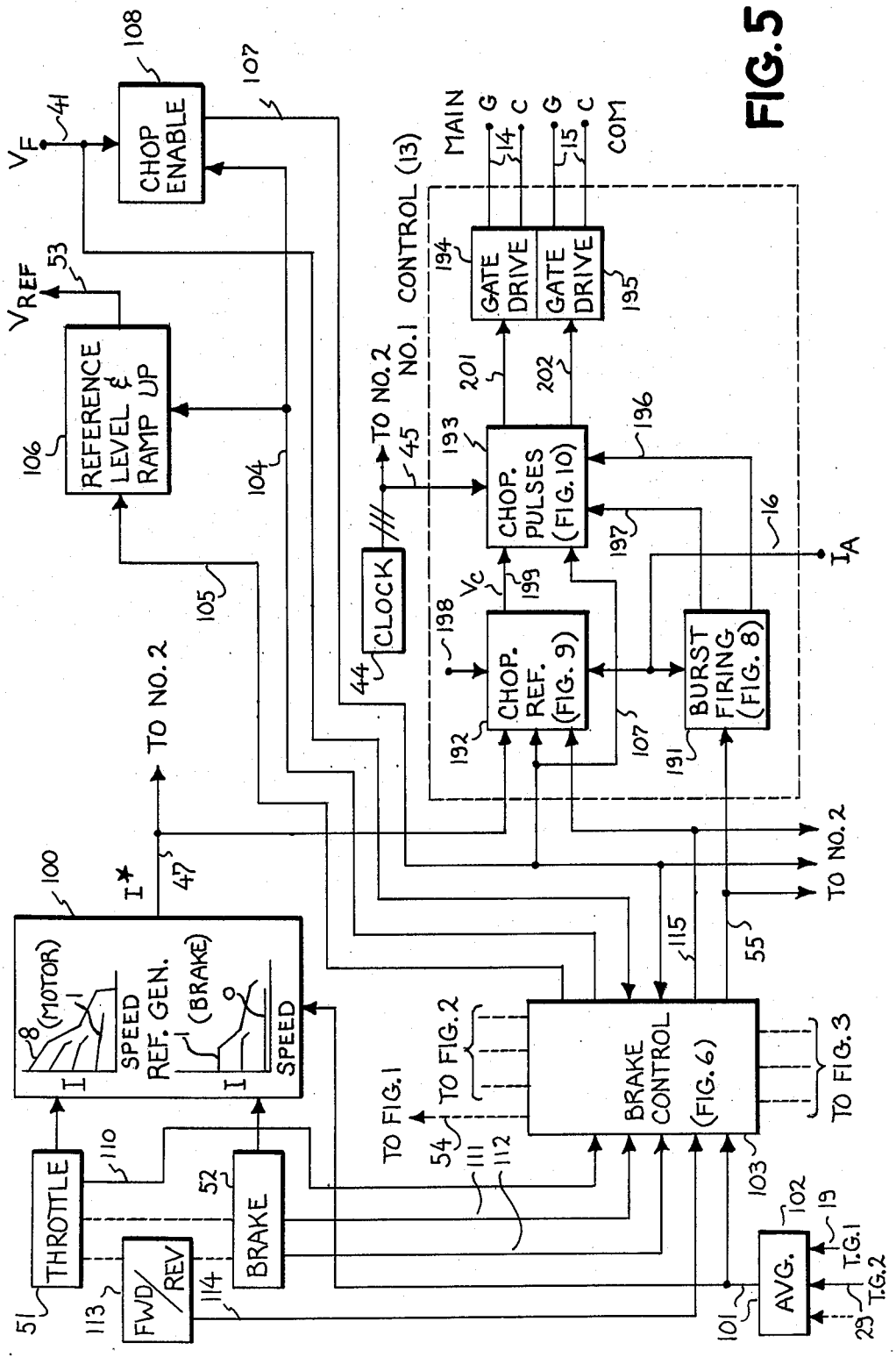
FIG. 5 is a functional block diagram of the master controls and the No. 1 chopper control shown as single blocks in FIG. 1.

FIG. 5 (Master Controls)

The master controls 50 of the propulsion system as well as the No. 1 control means 13 that periodically turns on and off the first chopper 12 have been illustrated in FIG. 5 in functional block diagram form. As is shown in FIG. 5, the master controls comprise a reference generator 100 that receives inputs from both the throttle 51 and the brake controller 52 and that also receives a third input, representative of vehicle speed, on a line 101 from an averaging circuit 102 which is coupled by lines 19 and 29 to the speed sensors (tachometer generators 18 and 28) associated with the respective motors M1 and M2. The reference generator 100 is operative to produce a current call signal I* which is fed via the output line 47 to both the No. 1 and No. 2 control means. In practice, the current call signal is passed through a conventional power limit circuit (not shown) which proportionately reduces its value in response to either low voltage on the filter capacitor or overcurrent or overtemperature in the power transformer. The master controls further comprise a brake control block 103 coupled by lines 104 and 105 to block 106 labeled "Reference Level & Ramp Up" and coupled by the line 104 and another line 107 to a block 108 labeled "Chop Enable." The brake control block 103 receives inputs on line 110 from the throttle 51 and on lines 111 and 112 from the brake controller 52.

In the illustrated embodiment of the present invention, the throttle 51 and the brake controller 52 are mechanically interlocked with each other and with a manually operated, two-position forward/reverse controller 113. Together with the reference generator 100, these components form conventional command means for the propulsion system of an electric locomotive. The command means has alternative motoring and braking states. In its motoring state, the brake controller 52 is locked in an "off" position and a manually operated handle (not shown) of the throttle 51 can be selectively moved in eight steps or "notches" between a low power position (notch 1) and a maximum power position (notch 8). The reference generator 100 is suitably constructed and arranged to vary the current call signal I* as a function of both the selected power notch of throttle 51 and the average speed of the traction motors of the propulsion system. The graph shown in FIG. 5 in the upper half of the reference generator block 100 indicates the manner in which the value of I* varies with speed for various different power notches of the throttle 51.

In the braking state of the command means, the throttle 51 is locked in an "idle" position and a manually operated handle (not shown) of the brake controller 52 can be freely moved through a "brake on" sector between a predetermined low limit or 0 brake (minimum braking rate) and a predetermined maximum limit 1.0 (maximum braking rate). The reference generator 100 will now vary the current call signal I* as a function of both the setting of the brake controller 52 (in its brake on sector) and the average speed of the traction motors. Brake position 1.0 results in I* being maintained at a constant maximum value (which corresponds, e.g., to armature current of approximately 880 amps) throughout a low speed range and being varied inversely with speed above the corner point. This maximum characteristic is indicated by the graph shown in FIG. 5 in the lower half of the reference generator block 100. At other positions of the brake handle, I* is reduced proportionately to the setting of the brake controller 52 (e.g., at 0.5 brake, the highest I* is approximately 440 amps).

The interlocking of the throttle 51 and the brake control 52 make it necessary for the operator to follow a prearranged sequence of operations in order to change from motoring to braking states. The throttle handle must first be moved to its notch 1 position from any higher notch (which therefore reduces the current call signal I* to its lowest value for the given speed at which the vehicle happens to be moving), and it can then be moved from notch 1 to "idle." In the idle position of the throttle 51 the brake handle is no longer locked in its "off" position. Now the brake controller 52 can be moved to a brake "set up" position which locks the throttle in its idle position. In this state, referred to hereinafter as the transition state, the illustrated command means is in between its motoring and braking states. Subsequently the operator can advance the brake handle from its set up position to the brake on sector, starting with the aforesaid low limit. When a return to the motoring state is desired, this sequence is reversed. The interlocks also prevent the forward/reverse controller 113 from changing position except when the throttle is in idle and the brake is off.

The throttle 51 and the brake 52 are coupled to the brake control block 103 by means of lines 110, 111, and 112 in order to supply the latter component with indications of their respective positions. Expressed in digital terms, the throttle 51 provides on line 110 a logic signal that is low or "0" whenever the throttle is in its idle position and high or "1" when the throttle is in any one of its power notches. Similarly, the brake controller 52 provides on line 111 a logic signal that is low or "0" whenever the brake is off and high or "1" when the brake is in either its set up position or its brake on sector. The brake controller also provides on the line 112 a logic signal that is low or "0" when the brake is in either its off or set up position and that is high or "1" whenever the brake is in the brake on sector (0 brake to 1.0 brake). The forward/reverse controller 113 is also coupled to the brake control block 103 by a line 114 on which is provided a logic signal that is low or "0" whenever this controller is in a reverse position and high or "1" whenever a forward position is selected.

The brake control block 103 responds to a state change of the command means by appropriately actuating the various contactors shown in FIGS. 1, 2 and 3. More details of a practical embodiment of the brake control block are shown in FIG. 6 which will soon be described. From the subsequent description of FIG. 6 it will be apparent that the contactor 34 (FIG. 1) connecting the propulsion system to the power transformer 38, which contactor is coupled via the line 54 to the brake control block 103 in FIG. 5, is temporarily opened and then reclosed during a state change of the command means. The opening of the contactor 34 is indicated by a reset signal on the line 104 from the block 103. In digital terms, whenever the contactor 34 is open the reset signal on line 104 is low or "0", but when the contactor 34 is later reclosed and certain other inputs are normal, the signal on the line 104 changes to a high or "1" level.

The reset signal line 104 is connected to the reference level and ramp up block 106. This component of the master controls is designed to produce and to set the value of a voltage reference signal $V_{REF}$ that is supplied over the line 53 to the previously described regulating means 36 (FIG. 1). The block 106 is reset in response to a 0 signal on the line 104, whereby $V_{REF}$ is reduced to a low value (e.g., zero) whenever the contactor 34 opens to disconnect the controllable converter 33 from its voltage source. Upon reclosing the contactor 34, the signal on the reset line 104 changes from 0 to 1. A 1 signal on this line enables the block 106 to increase or ramp up $V_{REF}$ to a predetermined value which depends on whether the command means has been changed to its motoring state or to its braking state. The reference level and ramp up block 106 is suitably constructed and arranged so that $V_{REF}$ increases at a predetermined rate (e.g., 2500 volts per second) until it attains either a first level corresponding to approximately 850 volts if there is a low or "0" signal on the line 105 (indicating a braking mode of operation) or a second higher level corresponding to approximately 1750 volts if the signal on line 105 is high or "1" (indicating a motoring mode of operation). After $V_{REF}$ reaches its present level, the regulating means 36 is effective to control the converter 33 so as to prevent the voltage across the filter capacitor 60 from falling below the aforesaid first level when the propulsion system is operating in its braking mode or from rising above the aforesaid second level when the propulsion system is operating in its motoring mode.

As is shown in FIG. 5, the reset signal line 104 from the brake control block 103 is also connected to one input of the chopper enable block 108. Another input of the block 108 is connected to the line 41 for receiving the capacitor voltage feedback signal from the filter 32. The latter signal is representative of the voltage across the filter capacitor 60 (FIG. 2), which voltage is identified by the reference character $V_F$ in FIG. 5 and hereinafter. The output of the block 108 is supplied on the line 107 to the brake control block 103 and also to the No. 1 (and No. 2) chopper control means 13 (and 23).

The chopper enable block 108 comprises bistable means that is suitably constructed and arranged to detect the magnitude of the input on line 41 and to change states as this magnitude traverses predetermined "pickup" and "dropout" levels. It is in a dropped out state when $V_F$ is relatively low (e.g., below 500 volts) and in a picked up state when $V_F$ is relatively high (e.g., above 725 volts). So long as the bistable means is in its dropped out state, a low or "0" signal is provided on the output line 107 of the chopper enable block 108. But when the bistable means is in its picked up state and in response to the presence of a 1 signal on the reset line 104, the chopper enable block is effective to provide a high or 1 signal (hereinafter referred to as the chop enable signal) on the output line 107. Thus a chop enable signal indicates that the contactor 34 is closed, the filter capacitor 60 is charged in an appreciable voltage level, and certain other inputs are normal.

In the brake control block 103, operation of the means that temporarily closes the field boost switch FS (FIG. 3) is prevented and no burst firing signal can be supplied on line 55 in the absence of the chop enable signal on line 107. Upon receipt of this signal, the field boost period commences, providing that the command means is then in its braking state and the propulsion system has been reconnected by opening the contactor M and closing the contactor B, and providing further that the speed feedback signal on the line 101 indicates that the average motor speed is not below a predetermined low magnitude (e.g., an angular velocity corresponding to a vehicle speed of approximately 3 MPH). In delayed response to the commencement of field boost, the brake control block 103 supplies the burst firing signal on line 55 to the No. 1 (and No. 2) chopper control means 13 (and 23). The brake control block 103 is also effective during the braking mode of operation to supply to these control means a signal designated B' on a line 115.

Figure 6A:
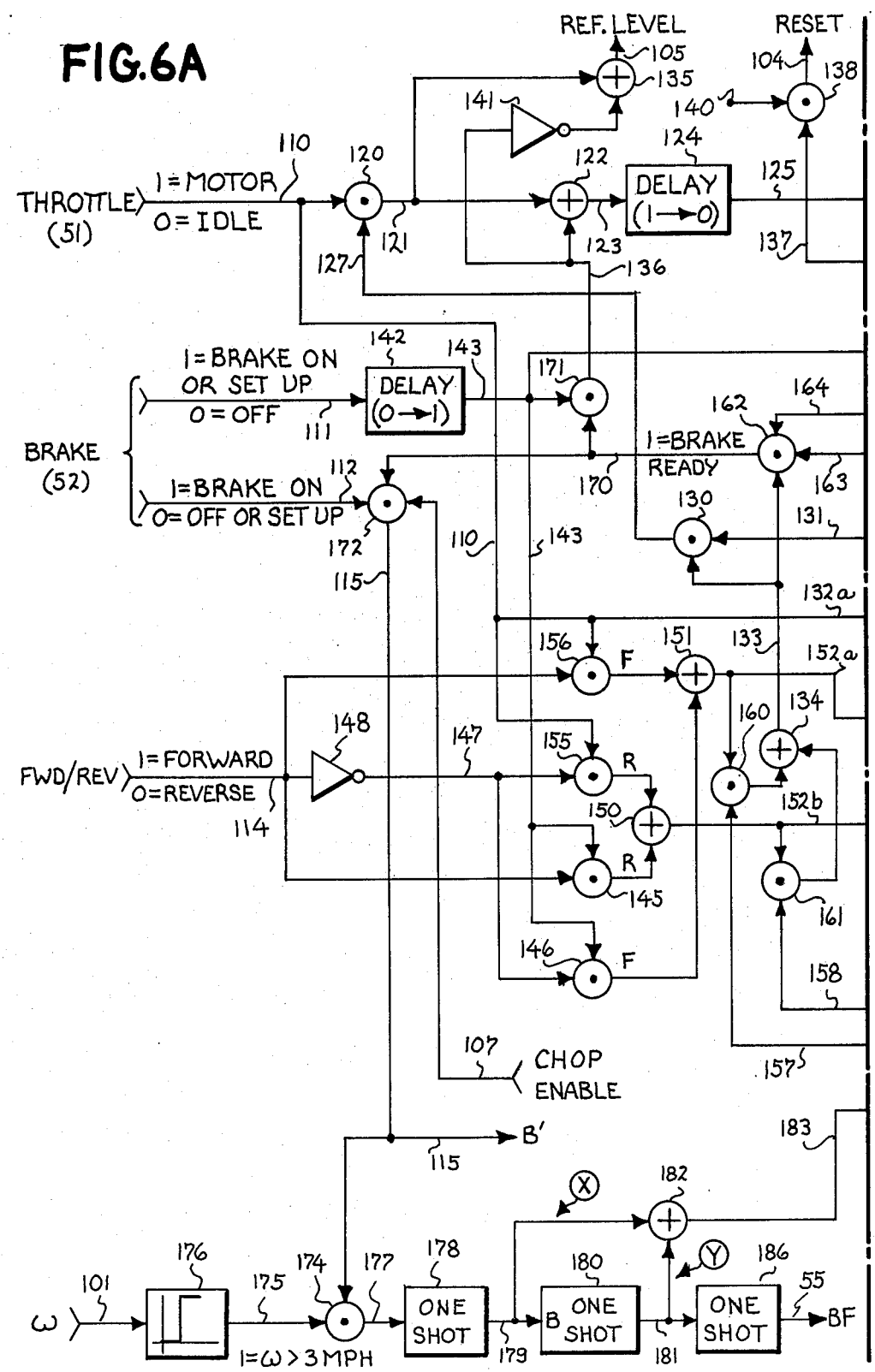

FIGS. 6A and 6B

Details of a preferred embodiment of the brake control block 103 are shown in FIG. 6 which will now be described. This figure is a combination of two contiguous figures 6A and 6B. FIG. 6B is located on the same sheet as FIG. 6 and shows the actuating mechanisms of the various contactors and the reverser. FIG. 6A is on a separate sheet, and it shows a schematic diagram of logic circuits and other components that are used to control these actuating mechanisms. In FIG. 6A each of the encircled dots symbolizes a conventional AND logic function (output is high or 1 only when all of its inputs are 1, otherwise output is low or 0), and each of the encircled plus signs symbolizes a conventional OR logic function (output is 1 if any one or more of its inputs is 1, and output is 0 only when all inputs are 0). Known electromechanical hardware or solid state electronic equivalents can be used to implement these logic functions. Typically, cam actuated interlock contacts on the throttle and brake controller and conventional interlocks of the contactors and reverser are appropriately interconnected for this purpose.

The brake controls shown in FIGS. 6A and 6B comprise three main parts: means for opening and reclosing the contactor 34, brake setup means, and field boost means. The first-mentioned means includes an AND logic circuit 120 connected by a line 121 to an OR logic circuit 122 whose output is coupled via a line 123, a time delay component 124, and a line 125 to a mechanism 126 (FIG. 6B) that actuates the movable main contacts of the contactor 34 (FIG. 1). The circuit 120 has two inputs: one is received on the line 110 and indicates the position of the throttle 51, and the other is received on a line 127 from the output of an AND logic circuit 130. The latter circuit in turn responds to two inputs. The first input of circuit 130 is coupled via a line 131 to an interlock contact (not shown) of a mechanism 132 (FIG. 6B) that actuates the contactor M (FIG. 3) to which it is coupled via broken line 129, and a 1 signal on the line 131 indicates that the contactor M is closed. (Note in FIG. 6B that the same mechanism 132 that actuates the contactor M is also coupled by line 129 to the contactor B. This mechanism has a flip flop type of control which is set in a first stable state in response to a 1 signal on a first input line 132a and which is reset to an alternative stable state in response to a 1 signal on a second input line 132b. In the first state the mechanism 132 will maintain M closed and B open, whereas in the alternative state the mechanism maintains B closed and M open. The first input line 132a of this mechanism is connected directly to the line 110 so that M is closed and B is open when the throttle 51 is positioned in one of its power notches. In some applications of the invention it may be desirable to obtain the same results by using separate mechanisms to actuate the respective contactors M and B.)

The second input to the AND logic circuit 130 of the contactor opening and reclosing means is received on a line 133 from the output of an OR logic circuit 134. As will soon be explained, the output from the circuit 134 is 1 whenever the reverser RR (FIG. 3) is in the correct one of its two positions. Consequently a 1 signal on the output line 127 of the logic circuit 130 indicates that the propulsion system is properly connected for motoring operation. So long as there are 1 signals on both lines 110 and 127, there is a 1 signal on the output line 121 of the AND logic circuit 120, and this signal is passed through the OR logic circuit 122, the time delay component 124, and the line 125 to the contactor mechanism 126. In response to a 1 signal on line 125, the mechanism 126 maintains the contactor 34 closed. The 1 signal on the output line 121 of the logic circuit 120 is also passed through an OR logic circuit 135 to line 105 which is coupled to the reference level and ramp up block 106 (FIG. 5) so as to set $V_{REF}$ at the value desired during the motoring mode of operation.

To start a motoring-to-braking state change of the command means, the handle of the throttle 51 is moved from power notch 1 to idle. This event is indicated by a signal change from 1 to 0 on the line 110, and as a result the signal on the output line 121 of the logic circuit 120 changes from 1 to 0. This causes a corresponding signal change on the output line 123 of the logic circuit 122, providing that there is then a 0 signal on a second input line 136 of this circuit. (As will soon be explained, the state of the signal on line 136 is determined by the brake set up means. This signal is 0 during the motoring mode of operation but changes to 1 in response to the brake controller 52 being moved to its set up or on position and the propulsion system being properly reconnected for braking operation.) A short time after the signal on line 123 changes from 1 to 0, the signal on the output line 125 of the delay component 124 goes to 0, and the actuating mechanism 126 opens the contactor 34 in response to a 0 signal on line 125. The delay introduced by component 124 allows time for the choppers 12 and 22 to reduce armature currents in the respective traction motors at a controlled rate to a low magnitude or zero before the contactor 34 disconnects the propulsion system from the power source. Such armature current reduction occurs at the end of the motoring mode of operation in response to the current call signal I* (FIG. 5) being reduced by movement of the throttle to its power notch 1 and to its idle position.

As soon as the contactor 34 opens, there is a signal change from 1 to 0 on a line 137 that is coupled to an interlock contact (not shown) of the contactor actuating mechanism 126. This line is connected as an input to an AND logic circuit 138 whose output supplies the aforesaid reset signal to the line 104. Thus the signal on line 104 changes from 1 to 0 in response to the opening of the contactor 34, and this will reset the reference level and ramp up block 106 as previously described. When the contactor 34 is subsequently reclosed, the signal on line 137 changes from 0 to 1. Hence the reset signal on line 104 returns to a 1 state, providing that at the same time a 1 signal is being supplied from a terminal 140 to the second input of the AND logic circuit 138. The terminal 140 is adapted to be connected to means (not shown) for supplying an input signal that is 1 so long as certain conditions are normal. Such conditions can compromise, e.g., the power transformer 38 being energized, proper control power being present, and a master shutdown switch being in a run or on state.

Upon operation of the brake set up means (described below), the signal on the line 136 changes from 0 to 1, and this 1 signal is passed through the OR logic circuit 122, the delay component 124, and the line 125 to the actuating mechanism 126 which automatically recloses the contactor 34 in response thereto. The delay component 124 is suitably designed so that it does not delay this 0 to 1 signal change. The 1 signal on the line 136 is also supplied to inverting means 141 whose output is connected to the OR logic circuit 135, and therefore the reference level signal on the line 105 changes from 1 to 0 at the same time reclosure of the contactor 34 is initiated by the brake set up means. A zero 0 signal on line 105 sets $V_{REF}$ at a value that is desired during the braking mode of operation.

In the brake set up means of the brake control block, the signal on the line 111 is fed through a time delay component 142 to a line 143 having three branches. One branch of the line 143 extends to FIG. 6B where it is connected not only to the second input line 132b of the mechanism 132 that actuates the contactors M and B (FIG. 3) but also to the input of an actuating mechanism 144 that is coupled by broken line 57a to the two-pole dynamic brake contactor BB (FIG. 2). When the signal on the line 143 changes from 0 to 1, the mechanism 132 actuates the contactor M to its open position and actuates the contactor B to its closed position, thereby reconnecting the propulsion system for braking operation, and at the same time the mechanism 144 closes the contactor BB to connect the dynamic brake resistor grid across the filter capacitor. This signal change on the line 143 takes place in delayed response to movement of the brake controller 52 from off to set up positions. The delay introduced by the component 142 ensures that armature current in the contactor M has time to decay to a low magnitude or zero before the contactor M opens.

Another branch of the line 143 provides inputs to two AND logic circuits 145 and 146 that are respectively labeled R and F in FIG. 6A. The second input to the first circuit 145 is received on the line 114 and indicates the position of the forward/reverse controller 113 (FIG. 5), whereas the second input to the second circuit 146 is received on a line 147 from the output of inverting means 148 whose input is connected to the line 114. Consequently, if the controller 113 is in a forward position when a motoring-to-braking state change of the command means takes place, the output signal of the first circuit 145 will reflect the 0 to 1 change on the line 143, but if the controller 113 were in a reverse position at this time, the output signal of the second circuit 146 would reflect such change. The output of the circuits 145 and 146 are fed, respectively, through an OR logic circuit 150 to a line 152b and through an OR logic circuit 151 to a line 152a. The second input to the logic circuit 150 is supplied by an AND logic circuit 155 whose first input is received on the line 110 and whose second input is received on the line 147, and a second input to the logic circuit 151 is supplied by another AND logic circuit 156 whose first input is also received on the line 110 and whose second input is received on the line 114.

The line 152b from the output of the OR logic circuit 150 and the line 152a from the output of the OR logic circuit 151 are both connected to an actuating mechanism 152 (FIG. 6B) that is coupled by broken line 153 to the movable contacts of the reverser RR (FIG. 3) associated with motor M1 and to the contacts of a corresponding reverser (not shown) associated with motor M2. This mechanism has a flip flop type control; it maintains the movable contacts of the reverser in their first position (engaging stationary contacts F1 and F2) in response to a 1 signal on the line 152a, and it maintains the movable contacts of the reverser in their second position (engaging stationary contacts R1 and R2) in response to a 1 signal on the line 152b. The reverser RR is shown in its first position in FIG. 3. Hereinafter this will be called position F, and the second position of the reverser will be called position R.

In operation, assuming that the vehicle is being propelled in the forward direction, the mechanism 152 will actuate the reverser RR from position F to position R in response to a motoring-to-braking transition of the command means, and it will actuate the reverser from position R to position F in response to a braking-to-motoring transition. Assuming instead that the vehicle is being propelled in the reverse direction, the mechanism 152 will actuate the reverser RR from position R to position F in response to a motoring-to-braking transition of the command means, and it will actuate the reverser from position F to position R in response to a braking-to-motoring transition. In each case, this operation of the brake set up means reverses the polarity of the connection of the series field winding 81 relative to the motor armature 80. While not shown in FIGS. 6A and 6B, the mechanism for opening and closing the R1,R2 contacts of the reverser could be separate from the mechanism for opening and closing the F1,F2 contacts, and in some applications of the invention it will be desirable to provide additional interlocking to ensure that the reverser changes positions only when both of the contactors M and B are open.

To indicate the position of the reverser RR, interlock contacts (not shown) associated with the actuating mechanism 152 are coupled to lines 157 and 158. A 1 signal on the line 157 indicates that the reverser is in position F, and this signal provides an input to an AND logic circuit 160 whose other input is taken from the input line 152a of the mechanism 152. As is shown in FIG. 6A, the output of the circuit 160 serves as one input to the OR logic circuit 134 whose output is connected to the line 133, and it is 1 whenever a 1 signal on line 152a is directing the mechanism 152 to actuate the reverser RR to its position F and there is a 1 signal on line 157 to indicate that the reverser in fact is in this position. On the other hand, a 1 signal on the line 158 indicates that the reverser is in position R, and this signal provides an input to another AND logic circuit 161 whose second input is taken from the input line 152b of the mechanism 152. The output of the circuit 161 serves as another input to the OR logic circuit 134, and it is 1 whenever a 1 signal on line 152b is directing the mechanism 152 to actuate the reverser to its position R and there is a 1 signal on line 158 to indicate that the reverser in fact is in this position. Thus, the signal on the output line 133 of the circuit 134 is in a 1 state whenever there is proper correspondence between the directed position and the actual position of the reverser RR. This signal is fed to an input of the previously described AND logic circuit 130, and it also is fed to an input of another AND logic circuit 162. The latter circuit responds to two additional inputs received on lines 163 and 164, respectively. Line 163 is coupled to an interlock contact (not shown) of the M/B actuating mechanism 132, and a 1 signal on this line indicates that the contactor B is closed. The other line 164 is coupled to an interlock contact (not shown) of the mechanism 144 that actuates the dynamic brake contactor BB, and a 1 signal on this line indicates that the contactor BB is closed.

The signal on line 164 is also employed to activate staging means 165 for controlling a pair of actuating mechanisms 166 and 167 that are respectively coupled by lines 57b and 57c to the staging contactors B1 and B2 in the dynamic brake circuit 56 (FIG. 2). As is indicated in FIG. 6B, there are three lines 41, 168, and 169 connected to the staging means 165 for respectively supplying it with the capacitor voltage feedback signal, a first reference signal representing a maximum level of voltage (e.g., 1650 volts) that is permissible on the filter capacitor during the braking mode of operation, and a second reference signal representing a desired minimum capacitor voltage (e.g., 1200 volts). The staging means 165 is conventionally constructed to close and open the contactors B1 and B2 as necessary to minimize excursions of $V_F$ above the maximum level or below the minimum level.

With a 1 signal on each of the lines 133, 163, and 164, all three inputs of the AND logic circuit 162 are 1 and consequently there is a 1 signal on the output line 170 of this circuit. A 1 signal on the output line 170 indicates that the propulsion system has been properly reconnected for braking operation. In other words, the system is ready to begin a braking mode of operation. The line 170 is connected to one input of an AND logic circuit 171, and the third branch of the line 143 is connected to the other input of this circuit. The output of the circuit 171 is connected to the line 136, and consequently the signal on the output line 136 is in a 1 state whenever the system is set up for braking and the brake controller is either in its set up position or in its brake on sector. As was previously mentioned, a 1 signal on the line 136 is passed through the OR logic circuit 122, the delay component 124, and the line 125 to the mechanism 126 which responds thereto by actuating the contactor 34 to its closed position.

The field boost means of the brake control block includes an AND logic circuit 172 having three inputs. As can be seen in FIG. 6A, the first input of the logic circuit 172 is received on the line 112, and it changes from 0 to 1 at the start of the braking state of the command means when the brake controller 52 is moved from its set up position to its brake on sector. The second input of the circuit 172 is received on the line 170, and it changes from 0 to 1 in response to operation of the brake set up means to reconnect the propulsion system for braking. The third input of the circuit 172 is received on the line 107, and it changes from 0 to 1 when the chop enable signal is provided by the chopper enable block 108 (FIG. 5) in response to a 1 signal on the reset line 104 and a high filter capacitor voltage $V_F$. The output of the circuit 172 is connected to the line 115, and it will be in a 1 state whenever there are 1 signals on all three inputs of this circuit, as is true in the braking mode of operation. The 1 signal on the line 115 is the aforesaid B' signal which is supplied to the chopper control means 13 and 23. This signal is also supplied as one input to an AND logic circuit 174 whose other input is received on a line 175 from level detecting means 176. The level detecting means 176 is connected via the line 101 to the speed averaging circuit 102 (FIG. 5), and its input is a speed feedback signal $\omega$ representative of the average angular velocity of the armatures of the respective traction motors. So long as this feedback signal exceeds a particular value corresponding to a predetermined low vehicle speed (e.g., approximately 3 MPH), the means 176 will supply a 1 signal on the line 175 to the logic circuit 174, but the signal on line 175 is in a 0 state when the signal $\omega$ is below this value. Thus a 1 output from the logic circuit 174 is prevented whenever speed is below the predetermined low level.

The output of the AND logic circuit 174 is connected via a line 177 to the input of a one shot block 178. The component 178 can be a conventional monostable multivibrator which produces a 1 output signal having a predetermined fixed duration (e.g., 0.5 second) once triggered by the signal on line 177 changing from 0 to 1. The output of the component 178 is connected on a line 179 to a "B" input of a second one shot block 180 similar to the component 178 except that it is triggered by the signal on line 179 changing from 1 to 0, whereby the 1 signal on the output line 181 of the component 180 begins at the end of the 1 output signal on line 179. The output signals on the lines 179 and 181 are respectively noted by the reference letters X and Y in FIG. 6A. Both are connected through an OR logic circuit 182 to a line 183 which is connected to a mechanism 184 (FIG. 6B) for actuating the field boost switch FS (FIG. 3). The mechanism 184, which is coupled to the movable contacts of the switch FS by a broken line 185, is operative to close the switch FS only when there is a 1 signal on the line 183, as is true for a limited period of time (e.g., approximately one second) after the one shot component 178 is triggered.

The one shot block 178 is initially triggered at the start of the braking mode of operation (as soon as the brake controller is moved to its brake on sector and the brake set up means produces a 1 signal on the line 170 and a chop enable signal is supplied on line 107). So long as the system remains in its braking mode, the component 178 will be automatically retriggered anytime the vehicle slows down to a speed lower than the aforesaid predetermined low speed (e.g., 3 MPH) and subsequently accelerates to a speed above this threshold, whereupon the signals on the lines 175 and 177 change states from 0 to 1 and the field boost means responds by temporarily reclosing the switch FS which momentarily increases field excitation of the traction motors (now behaving as generators). Such retriggering is desirable because the electromotive force of these machines may have been too low to sustain armature current (and hence braking effort) when the vehicle was traveling slower than 3 MPH.

The output of the second one shot component 180 is connected on the line 181 to the input of yet another one shot block 186 similar to the first component 178 except that the fixed duration of its 1 output signal BF is much shorter (e.g., 2 milliseconds). This output signal is the aforesaid burst firing signal which is supplied on the line 55 to the chopper control means 13 and 23. The third component 186 produces its output signal when triggered in response to a 0 to 1 change of signal Y from the second one shot block 180, which event is delayed with respect to the initial triggering of the first one shot block 178 by an interval equal to the duration of the signal X on line 179. Therefore the signal BF commences approximately midway through the period of time that the field boost switch FS is closed.

FIG. 7

Figure 7:
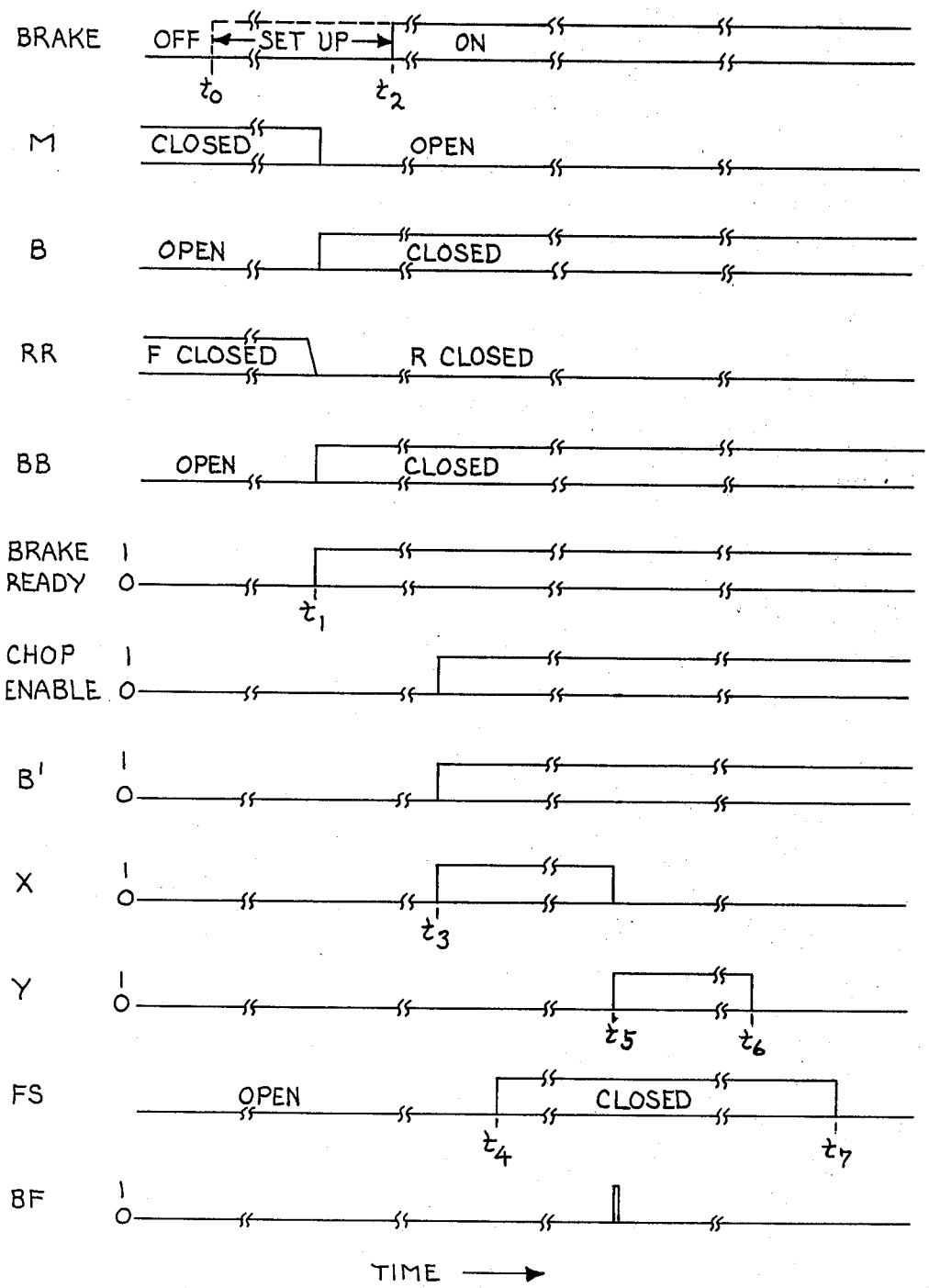
FIG. 7 is a chart showing the sequence in which the various components of the brake control are operated during a motor-to-braking transition.

The operation of the brake control means during a motoring-to-braking state change of the command means will now be summarized with the aid of FIG. 7. The motoring-to-braking sequence is begun by reducing the throttle setting to its lowest power notch (which reduces the current call signal I* to a low magnitude) and then moving the throttle handle to idle. This step of the transition process causes the signal on the line 110 to change from 1 to 0, and in response thereto the contactor 34 is opened, the signal on the voltage reference reset line 104 is changed from 1 to 0, and the chop enable signal on line 107 is terminated (i.e., changed from 1 to 0). The first step also unlocks the brake controller 52 which can now be moved from its off position to the brake set up position. The command means is now in its transition state.

In FIG. 7 the beginning of the transition state is noted as time $t_0$. At this time the signal on the line 111 changes from 0 to 1, and in delayed response thereto a 1 signal on the line 143 causes four events to take place. Two of these events are implemented by the M/B actuating mechanism 132 which is directed by the 1 signal on line 143 (and hence on line 132b) to open the contactor M and to close the contactor B. The third event is implemented by the RR actuating mechanism 152 which is directed by the concurrence of the 1 signal on line 143 and a 1 signal on either line 114 or line 147 to reverse the position of the reverser RR. Assuming that there is a 1 signal on the line 114, this event will open the F1,F2 contacts and close the R1,R2 contacts of the reverser RR. The fourth event is implemented by the BB actuating mechanism 144 which is directed by the 1 signal on line 143 to close the dynamic brake contactor BB. These four events do not necessarily happen simultaneously, and whichever one that takes place last will cause the brake ready signal on line 170 to change from 0 to 1, as is indicated at time $t_1$ in FIG. 7. The resulting 1 signal on line 136 (and hence on line 125) directs the contactor actuating mechanism 126 to reclose the contactor 34, whereupon the signal on the reset line 104 changes from 0 to 1 (a 1 signal on terminal 140 is assumed). Now the voltage reference signal $V_{REF}$ ramps up to the desired level (as set by a 0 signal on the reference level line 105), and as soon as the capacitor filter voltage $V_F$ attains a sufficiently high magnitude (at time $t_3$ in FIG. 7), a chop enable signal is supplied to line 107.

Anytime after $t_0$ the operator can move the brake controller 52 to its brake on sector, thereby terminating the transition state and starting the braking state of the common means. The action, which is indicated by the signal on the line 112 changing from 0 to 1, could take place earlier or later than $t_3$. In FIG. 7 it is shown at a time $t_2$ that is earlier than $t_3$. As soon as the signal on line 112 is 1 and both the brake ready signal on line 170 and the chop enable signal on line 107 are 1, the B' signal on line 115 changes from 0 to 1. This marks the start of the braking mode of operation of the propulsion system, and it also triggers the first one shot block 178 of the field boost means (assuming that speed is not below 3 MPH). Therefore the signal X on line 179 changes from 0 to 1 concurrently with the signal B'.

When the signal X changes from 0 to 1, the resulting 1 signal on line 183 directs the FS mechanism 184 to close the field boost switch FS, and at time $t_4$ the movable contacts of this switch reach their closed circuit position to start a brief period of increased current in the series field windings of the traction motors. Subsequently, at time $t_5$, the signal X automatically reverts to its 0 state, thereby triggering the second one shot block 180. The signal Y on the output line 181 of block 180 now changes from 0 to 1. This maintains a 1 signal on line 183 until the signal Y, at time $t_6$, automatically reverts to its 0 state, whereupon the FS mechanism is directed to open the field boost switch FS. The switch FS returns to its open position at time $t_7$, thereby terminating operation of the field boost means. Signal Y changing from 0 to 1 at time $t_5$ also triggers the third one shot block 186 which is then effective to produce on line 55 the burst firing signal BF that is shown by the bottom trace of FIG. 7.

In the illustrated embodiment of the present invention, the period of time that the field boost means is operative to close the switch FS (from $t_4$ to $t_7$ in FIG. 7) is approximately one second, and the the time ($t_5$) at which the one shot block 186 becomes effective to produce the signal BF is delayed until approximately 0.5 second after $t_4$. This delay allows time for the increased field current to overcome residual excitation in the field poles of each motor and to develop therein an appreciable reverse magnetic field before the associated chopper is turned on in the armature current path to begin the braking mode of operation. Alternatively, if the reverser RR were connected across the armature rather than the field windings of the motor, less time would be needed because the direction of field boost agrees with the direction of residual excitation, and therefore the $t_4$ to $t_5$ interval could be made much shorter by correspondingly shortening the fixed duration of the signal X. In some applications of the invention it might even be desirable to start operation of the field boost means before the armature reversing aspect of the operation of the brake set up means is completed.

FIG. 5 (Chopper Controls)

As is shown in FIG. 5, lines 55 and 115 from the brake control means shown in FIG. 6A are connected to the No. 1 (and No. 2) chopper control means 13 (and 23). The No. 1 control means 13 comprises a block 191 labeled "Burst Firing," a block 192 labeled "Chop. Ref," a block 193 labeled "Chop. Pulses," and a pair of blocks 194 and 195 each labeled "Gate Drive." The line 55 conveys the burst firing signal BF to an input of the burst firing block 191. Another input of this block receives on the line 16 the current feedback signal representative of armature current $I_A$ in motor M1. The burst firing block 191 has two output lines 196 and 197 connected to the chop pulses block 193, and it is suitably constructed and arranged (see FIG. 8) to supply on the line 196 a d-c gate signal that is contemporaneous with the burst firing signal on line 55 and to supply on line 197 a commutation suppressing signal that is initiated by the burst firing signal and terminated when the magnitude of $I_A$ increases to at least a predetermined threshold.

The line 115 conveys the B' signal to an input of the chopper reference block 192 in the No. 1 control means 13. Other inputs of this block receive, respectively, the chop enable signal on the line 107 from the chopper enable means 108, the current call signal I* on line 47 from the reference generator in the master controls, the current feedback signal on line 16 from the current transducer 17 in the armature current path of the motor M1, and certain additional signals from a terminal 198. The chopper reference block 192 is suitably constructed and arranged (see FIG. 9) to process these inputs and produce therefrom a variable control signal $V_C$ representative of the desired duty factor of the associated chopper 12. This control signal is supplied on a line 199 to the chopper pulses block 193.

The chopper pulses block 193 has five inputs that are respectively connected to lines 45, 199, 107, 197, and 196, and it has two output lines 201 and 202. Details of a preferred embodiment of this component are shown in FIG. 10 which will soon be described. Normally the chopper pulses block 193 is cyclically operative to produce on its output line 201 a train of first periodic gating signals of relatively short predetermined duration (e.g., 10 microseconds) and to produce on its second output line 202 a train of periodic second gating signals of the same short duration. The first gating signals are supplied on line 201 to the input of the gate driver 194 whose output is coupled via the lines 14 to the gate and cathode terminals G and C of the main thyristor 70 in the No. 1 chopper 12, and the component 194 is suitably constructed and arranged to supply a firing signal to this main thyristor in response to each of the first gating signals received on line 201. The periodic second gating signals from the chopper pulses block 193 are supplied on the line 202 to the input of the companion gate driver 195 whose output is coupled via lines 15 to the gate and cathode terminals G and C of the auxiliary or commutating thyristor 72 in the No. 1 chopper, and the component 195 is suitably constructed and arranged to supply a firing signal to this commutating thyristor in response to each of the second gating signals received on line 202. As will be apparent hereinafter from the description of FIG. 10, the first gating signals on line 201 are produced alternately with the second gating signals on line 202, whereby the gate drivers are effective to alternately turn on and turn off the chopper. The chopper pulses block 193 includes means for synchronizing the second gating signals with the clock pulses on line 45 and means responsive to the value of the variable control signal $V_C$ on line 199 for influencing the timing of the first and second gating signals so as to determine the duty factor of chopper No. 1.

At the beginning of a braking mode of operation, the d-c gate signal on line 196 is passed through the pulses block 193 to the output line 201 in the form of an extended chopper turn-on signal that effects firing of the main thyristor 70 throughout the period of the burst firing signal on line 55, which period is substantially longer than the duration of a first gating signal that the block 193 periodically produces in normal operation. At the same time the commutation suppressing signal received on line 197 is effective in the block 193 to prevent the production of any second gating signal on the line 202 until the magnitude of armature current increases to at least the aforesaid predetermined threshold.

FIG. 8

Figure 8:
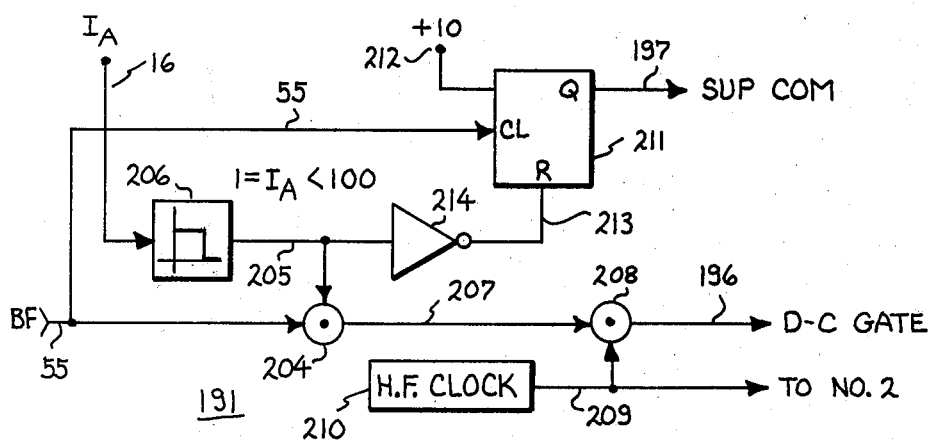
FIG. 8 is a schematic diagram of the burst firing block of FIG. 5.

With reference now to FIG. 8, a preferred embodiment of the burst firing block 191 of the No. 1 chopper control means 13 will be described. This component comprises an AND logic circuit 204 having two inputs: one is the burst firing signal BF received on the line 55, and the other is received on an output line 205 of level detecting means 206. The level detector 206 is supplied via the line 16 with the current feedback signal that indicates the actual magnitude of armature current $I_A$ in the motor M1, and it is suitably constructed and arranged to produce on its output line a signal that is 1 so long as $I_A$ is less than a predetermined threshold magnitude (e.g., 100 amperes) and that is 0 when the magnitude of $I_A$ increases to at least this threshold. As was previously explained, $I_A$ will be low or zero at the start of the field boost period, and therefore both inputs of the logic circuit 204 will be 1 when the burst firing signal appears on line 55. At this time the output signal of the circuit 204 changes from 0 to 1.

The output of the AND logic circuit 204 is connected by a line 207 to an input of another AND logic circuit 208 whose second input is received on a line 209 from a high frequency clock 210 that generates a train of discrete "1" pulses. By way of example, the frequency of the pulses on line 209 is 21.6 KHz, and each pulse can have a duration of 10 to 20 microseconds. The output signal of the logic circuit 208 therefore comprises a burst of high-frequency pulses that lasts for an interval equal to the duration of the 1 output signal from the logic circuit 204. The duration of the latter signal normally corresponds to the period of the burst firing signal on line 55, namely, approximately 2 milliseconds. The output signal of the circuit 208 is the d-c gate signal that is supplied over the line 196 to the cyclically operative chopper pulses block 193 in the No. 1 chopper control means 13 (FIG. 5), and during its presence on line 196 the block 193 will be effective to supply an extended chopper turn on signal to the gate driver 194 of the main thyristor 70 in the chopper 12. The duration of the latter signal is substantially longer than the predetermined duration of the periodic first gating signals that are normally produced by the pulses block 193. Preferably the duration of the extended chopper turn on signal is at least 100 times longer than that of the first gating signals, and in the example given herein it is approximately 200 times longer. This ensures that if a motoring-to-braking transition were commanded while the vehicle is moving at a relatively low speed, the initial firing signal for turning on the chopper will not expire prematurely, before armature current has time to attain the latching level of the main thyristor, and it consequently ensures that the chopper is in fact turned on and conducts armature current to begin the braking mode of operation of the propulsion system during the period of time that the series field of the motor M1 is being boosted to increase the electromotive force that is being generated in the armature of this machine. Once turned on, the chopper will freely conduct current in the armature current path of the motor M1, and the rise of current in this path, including the series field, will augment the field boost so that the electromotive force rapidly increases. This further enhances the buildup of armature current which soon attains its 100-amp threshold, ordinarily within less than one-half second of the time that the burst firing signal BF is produced.

As can be seen in FIG. 8, the burst firing signal BF on the line 55 in the burst firing means 191 is also supplied to a clock input of a conventional flip flop device 211 whose "D" input is connected to a d-c control power terminal 112 which is positive (e.g., +10 volts) with respect to a predetermined reference potential. The Q output of this device is connected to the line 197, and it changes from 0 to 1 when the clock input signal changes from 0 to 1 on receipt of the signal BF. Subsequently this output is changed back to 0 by applying a 1 signal to the reset input of the device 211. The reset input is connected via a line 213 and inverting means 214 to the line 205, whereby its 0 to 1 change coincides with the output of the level detecting means 206 changing from 1 to 0 as a result of armature current attaining the 100-amp threshold. The Q output signal of the device 211 is the commutation suppressing signal that is supplied over the line 197 to the pulses block 193 (FIG. 5), and in its 1 state this signal is effective to disable the pulses block 193 and thereby prevent it from producing any gating signals that would otherwise turn off the chopper 12. The commutation suppressing signal on line 197 is in its 1 state for an interval that begins at the same time as the burst firing signal BF and that ends as soon as armature current attains its 100-amp threshold. During this interval the chopper is turned on in response to the d-c gate signal on line 196 and then remains on continuously, but once the interval expires the pulses block 193 can resume normally producing gating signals to alternately turn off and turn on the chopper.

FIG. 9

Turning next to FIG. 9, a preferred embodiment of the chopper reference means 192 will now be described. This means, which was shown as a single block in FIG. 5, includes a summing point 216 having a first input connected to a current reference signal line 217, a second input connected to the current feedback signal line 16, and an output connected to an error signal line 218. The current reference signal on line 217 is representative of the desired magnitude $I_{REF}$ of armature current in the motor M1, the current feedback signal on line 16 is representative of the actual magnitude $I_A$ of this current, and the error signal on line 218 is therefore representative of the difference between $I_{REF}$ and $I_A$. Preferably the quiescent value of the error signal (i.e., its value whenever both the desired and actual magnitudes of armature current are zero) is negative with respect to the predetermined reference potential of the control power.

The error signal on line 218 is processed by a suitable gain network 219 having a proportional plus integral transfer characteristic, whereby a zero steady-state error can be obtained. The gain of the network 219 is varied as a function of speed (indicated by the speed feedback signal on line 19), current (indicated by the current feedback signal on line 16), and whether the system is in a motoring or braking mode of operation (indicated by the B' signal on line 115). In the braking mode, the transfer function of this component has a faster time constant and a higher gain than in the motoring mode. The output of the gain network 219 provides the variable control signal $V_C$ which is fed on line 199 to the cyclically operative chopper pulses block 193 in the No. 1 chopper control means 13 (FIG. 5). The value of $V_C$ varies as a function of any difference or error between $I_{REF}$ and $I_A$ and will tend to assume whatever value results in reducing this difference to zero. The value of $V_C$ can vary between predetermined first and second extremes, and it is varied in a sense approaching the second or high extreme (e.g., +10 volts on an analog basis) from its first or low extreme (e.g., −1.5 volts) so long as $I_A$ is less than $I_{REF}$. The timing of the alternate first and second gating signals that are periodically produced by the cyclically operative chopper pulses block 193, and consequently the duty factor of the chopper 12, are determined by the value of $V_C$ on line 199. When the value of $V_C$ is at its low extreme, the duty factor is zero (chopper turned off continuously), and when $V_C$ is at its high extreme the duty factor is 1.0 (chopper turned on continuously).

In order to provide the aforesaid current reference signal, the line 217 of the chopper reference means 192 is connected through three blocks 220, 221, and 222 in tandem to the line 47 on which the current call signal I* is received from the master controls. The block 220 is designed to be effective only in a braking mode of operation, as indicated by a B' signal on line 115, to prevent the current reference signal on line 217 from falling below a certain minimum value that corresponds to a predetermined magnitude of armature current (e.g., 100 amperes). This is desirable to maintain self excitation of the traction motor M1 and to ensure a minimum braking effort in the event the operator were to move the handle of the brake controller 52 to the lowest or zero position in its brake on sector. The block 221 is labeled "Jerk Limit," and it performs the conventional function of preventing the value of the current reference signal on the line 217 from being changed too fast. By way of example, the maximum rate of increase of the reference signal can be limited to a rate corresponding to 200 amps per second, and the maximum rate of decrease can be limited to a rate corresponding to 1000 amps per second.

The block 222 of the chopper reference means 192 is suitably constructed and arranged to perform dual functions. Its first function is to proportionately reduce the current call signal either in the event of a wheel slide involving the wheels that are coupled to the motor M1 or in response to low voltage on the commutating capacitor of the chopper 12 compared to the magnitude of armature current that has to be commutated. In FIG. 9, the two lines under the reference number 198 respectively represent the wheel slide and the commutating capacitor voltage inputs to the block 222. The second function of this block is to reset the current reference signal to a value corresponding to zero current whenever there is no chop enable signal on the line 107. For this purpose the block 222 includes means for clamping its output to a low or zero value in response to the signal on line 107 changing from 1 to 0, as happens at the beginning of a motoring-to-braking transition of the command means when the contactor 34 is opened in response to the throttle handle being moved to its idle position. If the current reference signal on line 217 were not already reduced in response to the handle of the throttle 51 being moved to power notch 1 and then to idle, it would now be driven at its maximum rate (as limited by the block 221) to a reset level that is slightly negative with respect to ground, thereby altering the value of the control signal $V_C$ as necessary to ensure that this signal attains the aforesaid low extreme. As a result, the chopper duty factor and hence $I_A$ are rapidly reduced to zero. Subsequently, when the chop enable signal returns to line 107 (at time $t_3$ in FIG. 7), the output of the block 222 is unclamped and the current reference signal on line 217 can increase to whatever value is being called for by the signal I* on line 47.

FIGS. 10 AND 11

FIG. 10 illustrates the preferred embodiment of the chopper pulses block 193. In this component the variable control signal $V_C$ on line 199 is supplied as one input to a summing point 224 where it is compared with a saw-tooth reference signal produced by a ramp generator 225. The ramp generator 225 is connected to the master clock 44 by a line 45a, and it is periodically reset by a phase 1 clock pulse on this line. The clock 44 generates a train of phase 1 pulses on the line 45a, each pulse being in a 1 state for a predetermined duration (e.g., 300 microseconds) and successive pulses recurring at a constant frequency (e.g., 300 Hz).

The ramp generator 225 comprises integrating means for changing the value of the reference signal at a predetermined constant rate and means operative in synchronism with the phase 1 clock pulses for periodically resetting the reference signal to a predetermined base value which is substantially equal to the aforesaid high extreme of the control signal $V_C$ (e.g., +10 volts). After being reset, the reference signal changes in a sense approaching the aforesaid low extreme value of $V_C$, and the rate of change is selected so that the reference signal excursion is approximately 10 volts during one period of the clock pulses. This reference signal is subtracted from $V_C$ in the summing point 224, and the difference is supplied on a line 226 to a zero crossing detector 227 whose output is fed on a line 228 to an AND logic circuit 230. In digital terms, the signal on the output line 228 is low or "0" so long as the value of the reference signal produced by the ramp generator is greater (i.e., more positive) than the value of the control signal $V_C$, and it is high or "1" whenever the latter signal is greater than the former. When $V_C$ is at its high extreme, the signal on line 228 is 1 continuously. When $V_C$ has a negative value the signal on line 228 is 0 continuously. When $V_C$ is in a range between zero and its high extreme, the signal on line 228 will changes states twice each cycle of the master clock; from 1 to 0 when reset by a phase 1 clock pulse, and from 0 to 1 concurrently with the value of the reference signal equalling the value of $V_C$.

Figure 11:
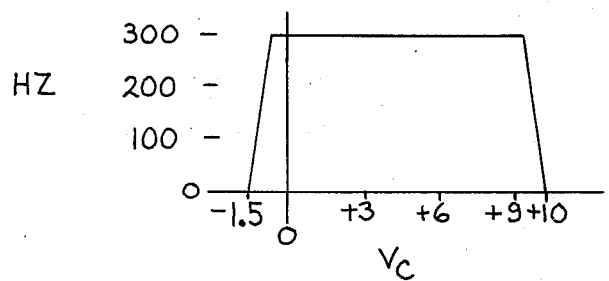
FIG. 11 is a graph showing the relationship of the output frequency to the input voltage of the V/F converter block of FIG. 10.

The variable control signal $V_C$ on line 199 and the phase 1 clock pulses on line 45a are also supplied as inputs to a voltage-to-frequency converter 231. This component is suitably constructed and arranged to periodically produce at its output F a train of discrete 1 signals having an average frequency that is related to the value of $V_C$ in accordance with the graph shown in FIG. 11. For variations of $V_C$ between its low extreme (−1.5 V) and a predetermined first intermediate value (e.g., −0.5 V), the frequency of the output signals F varies between zero and the clock frequency (300 Hz) as a direct linear function of the value of $V_C$. For variations of $V_C$ between its high extreme (+10 V) and a predetermined second intermediate value (e.g., +9.1 V), the frequency of the output signals F varies between zero and the clock frequency as an inverse linear function of the value of $V_C$. For variations of $V_C$ in a predetermined range that is defined by the aforesaid first and second intermediate values, the frequency of F is constant and equal to the frequency of the master clock. A V/F converter well suited for this purpose is disclosed and claimed in patent application Ser. No. 35,358 filed concurrently herewith for R. J. Griffith and T. D. Stitt and assigned to the General Electric Company. Such a converter is so arranged that a 0 to 1 change of its output signal F always coincides with the leading edge of a phase 1 clock pulse on the line 45a. This converter receives additional inputs via lines 45b and 45c from the master clock 44. The clock is designed to generate on line 45b a train of phase 2 pulses that are characterized by the same frequency and duration as the phase 1 pulses on line 45a but are displaced in time therefrom by a predetermined fraction of the period of the clock (e.g., by ⅓ period, or 1/900 second), and to generate on line 45c a train of phase 3 pulses that are similar to but further displaced in time from the phase 1 pulse (e.g., by ⅔ period or 2/900 second). A 1 to 0 change of each output signal F produced by this converter coincides with the leading edge of the phase 2 clock pulse that is next received after the output signal was initiated. In addition, this converter is arranged to produce at a second output E a signal that is 0 only when the value of $V_C$ is between its low extreme and the aforesaid first intermediate value and that otherwise is 1.

The output signal F of the converter 231 is connected by a line 232 to a first input of an AND logic circuit 233. Another input of the latter circuit is connected through a line 234 and inverting means 235 to the line 197 which receives the commutation suppressing signal from the burst firing block 191 (see FIGS. 5 and 8). Thus there is a 1 signal on line 234 except during intervals when the burst firing means is effective to supply a 1 signal on line 197. As is shown in FIG. 10, the third input of the logic circuit 233 is connected via a line 236 to the Q bar output of a conventional D type flip flop 237. The set input of the latter component is connected through inverting means 238 to the line 107 which receives the chop enable signal from the chopper enable means 108 (FIG. 5), and the clock input is connected through inverting means 239 to the output line 232 of the V/F converter 231. As will soon be explained, the flip flop 237 serves a pulse steering purpose when the signal on line 107 changes from 1 to 0. During normal operation the chop enable signal is 1 and the Q bar output of 237 is in a high or 1 state.

With 1 signals on both of its input lines 234 and 236, the logic circuit 233 will pass a 1 signal to its output line 240 concurrently with each of the periodic 1 signals from the output F of the converter 231. The line 240 is connected through an OR logic circuit 241 to the input of a one shot block 242 which produces a 1 output signal having a relatively short predetermined duration (e.g., 10 microseconds) whenever it is triggered by the signal on the line 240 changing from 0 to 1. The block 242 is connected by a line 243 to suitable amplifying and isolating means 244 which is effective while the output signal on this line is 1 to forward bias the base-to-emitter junction of an NPN transistor 245. The collector and emitter of the transistor 245 are coupled via terminals 202a and 202b to the input of the gate drive block 195 (FIG. 5), and when this transistor is forward biased its collector current is the aforesaid second gating signal that periodically causes the gate driver 195 to fire the commutating thyristor 72 in the No. 1 chopper 12. This happens each time the output signal F of the converter 231 changes from 0 to 1, providing that 1 signals are then present on both lines 234 and 236. Thus the frequency of the second gating signals is the frequency of the output signal F.

The output line 243 of the one shot block 242 is also connected to a reset input of another D type flip flop 247. As can be seen in FIG. 10, the clock input of the latter component is connected to the output line 248 of the AND logic circuit 230, and the D input is connected directly to the positive control power terminal 212. The Q output of this flip flop is coupled over a line 250 and an OR logic circuit 251 to the input of another one shot block 252 which produces a 1 output signal having a 10-microsecond duration each time it is triggered by the signal on the line 250 changing from 0 to 1. The block 252 is connected by a line 253 to suitable amplifying and isolating means 254 which is effective while the signal on this line is 1 to forward bias a transistor 255 whose collector and emitter are coupled via terminals 201a and 201b to the input of the gate drive block 194 (FIG. 5). When the transistor 255 is forward biased, its collector current is the aforesaid first gating signal that periodically activates the gate driver 194 which then fires the main thyristor 70 in the No. 1 chopper. This happens each time the signal on line 250 from the Q output of the flip flop 247 changes from 0 to 1.

The output of the flip flop 247 is reset to zero by the signal on line 243 each time a second gating signal is produced, and it thereafter is returned to a 1 state upon receipt of a 1 signal on the line 248 connected to the clock input. Once returned to 1, the Q output remains in this state until reset by the next 1 signal on line 243. As a result, in normal operation the signal on line 250 periodically changes from 0 to 1 at a frequency that is the same as the frequency of the second gating signals, and the first gating signals will alternate with the second gating signals.

The clock input of the flip flop 247 is connected by the line 248 to the output of the AND logic circuit 230. This circuit has four inputs: one is received on the line 228 from the output of the previously described zero crossing detector 227; another input is received on the line 236 from the Q bar output of the flip flop 237; the third is received on a line 256 from the E output of the V/F converter 231; and the fourth is received on a line 257 which is connected through inverting means 258 to the line 45a. The signal on line 257 serves a lockout function; it prevents a 1 signal on line 248 while each of the phase 1 pulses on line 45a is 1, which is the case for an interval of approximately 300 microseconds following the initiation of each of the second gating signals. This interval, referred to hereinafter as the lockout interval, is required to make sure that the first gating signal is not produced prematurely, i.e., before the commutating thyristor has time to be completely turned off during the commutation process of the chopper.

So long as there is no phase 1 pulse on the line 45a, the signal on line 257 is 1, and assuming 1 signals on both of the lines 236 and 256, the signal on the output line 248 of circuit 230 will now reflect the state of the signal on line 228. As was previously explained, the signal on line 228 changes from 0 to 1 whenever the saw-tooth reference signal produced by the ramp generator 225 decreases to the value of the control signal $V_C$ on line 199. Consequently, so long as $V_C$ has a value in a range between 0 and +9.1 V, the gating signals are produced at the constant frequency of the master clock (300 Hz) and the time interval from the production of one of the second gating signals for firing the commutation thyristor to the production of the succeeding first gating signal for firing the main thyristor varies inversely with the value of $V_C$. This interval is referred to as the off time ($t_{OFF}$) of the chopper 12. It decreases toward a predetermined minimum as the value of $V_C$ approaches 9.1 V. The minimum turn off time is the same as the aforesaid lockout interval (e.g., 300 microseconds).

The duty factor of the first and second gating signals is equal to $1 - f \times t_{OFF}$, where f is the frequency of the output signal F of the V/F converter 231. So long as this converter is operating in its constant 300 Hz mode, the minimum off time of 300 microseconds restricts the maximum duty factor to approximately 0.91. As $V_C$ increases from 9.1 V to its high extreme of +10 V, the duty factor is increased from 0.91 to nearly 1.0 by reducing the average frequency of the periodic output signals F of the converter 231 while maintaining the off time substantially equal to the aforesaid minimum.

The minimum duty factor of the chopper is also restricted in the constant frequency operating mode of the converter 231, even when $V_C$ is reduced to zero or to a negative value. This is because each time the commutating thyristor is fired it will conduct a pulse of load current having a minimum duration or width which is determined by the recharging time of the commutating capacitor 74 in the oscillatory commutation circuit 71. This minimum "on" time therefore depends on the parameters of the commutation circuit, and in a practical embodiment of the invention it results in a minimum duty factor of approximately 0.09 at a chopping frequency of 300 Hz. For variations of $V_C$ from −0.5 V to its low extreme of −1.5 V, the duty factor is decreased to nearly zero by reducing the average frequency of the periodic output signals F of the converter 231. During this variable frequency, minimum pulse width mode of operation, the first gating signals for firing the main thyristor are inhibited by the 0 signal on the line 256 which disables the AND logic circuit 230 and prevents it from supplying a 1 signal on line 248 to the clock input of the flip flop 247. Consequently no gating signals are supplied by the chopper pulses block 193 to the main gate driver 194, but the chopper is alternately turned on by firing its commutating thyristor and turned off by self commutation. The commutating thyristor is periodically fired in response to the second gating signals which the block 193 is now supplying to the gate driver 195 at a reduced frequency that varies with the value of $V_C$ and that is zero when $V_C$ is at its low extreme, and each time the commutating thyristor is fired it conducts armature current for a minimum on time ($t_{ON}$) until automatically extinguished by the ringing action of its oscillatory commutation circuit. The duty factor, which can be expressed as $f \times t_{ON}$, is proportional to the frequency of the output signals F of the V/F converter 231. It will now be apparent that the chopper pulses block 193 has the capability of smoothly varying the duty factor of the chopper over a continuum that extends from 1.0 when $V_C$ is at its high extreme (+10 V) to zero when $V_C$ is at its low extreme (−1.5 V).

As was previously explained, normally the signal on the chop enable line 107 is 1, but during a motoring-to-braking transition it is temporarily 0. Whenever this signal changes from 1 to 0, a 1 signal is applied to the set input of the flip flop 237, thereby changing the Q output of this component from 0 to 1 and the Q bar output from 1 to 0. The Q output is connected on a line 260 to a first input of an AND logic circuit 261 whose other input is connected to the line 250 and whose output is connected via a line 262 and the OR logic circuit 241 to the input of the one shot block 242. Consequently, if the chopper were in a turned on state (as indicated by a 1 signal on line 250) at the time the flip flop 237 is set, the 0 to 1 change of the Q output on line 260 would trigger the one shot 242 and steer one last gating signal to the gate driver 195 of the commutating thyristor, thereby turning off the chopper 12. At the same time, the 1 to 0 change of the Q bar output on line 236 disables the AND logic circuits 230 and 233, and no further gating signals can be produced by the chopper pulses block 193 so long as there is no chop enable signal on line 107. Later, after the chop enable signal is restored to its 1 state, the flip flop 237 will return its Q output to the 1 state and its Q bar output to the 0 state upon receipt of a 1 signal at its clock input (indicating that the F output of the V/F converter 231 has gone from 1 to 0), and now the chopper pulses block 193 can resume normally producing gating signals to alternately turn on and turn off the chopper with a duty factor determined by the value of $V_C$.

To ensure initial turn on of the chopper 12 during the period of time that the field of motor M1 is being boosted at the beginning of a braking mode of operation, the d-c gate signal on line 196 is connected through the OR logic circuit 251 to the one shot block 252. Preferably, as was pointed out above in connection with the description of FIG. 8, this d-c gate signal is actually a short (e.g., approximately 2 milliseconds) burst of high-frequency (e.g., 21.6 KHz) discrete 1 pulses. Such pulses will repetitively trigger the block 252, and consequently a corresponding burst of gating signals is produced at terminals 201a and 201b of the chopper pulses block 193. This burst of gating signals has the same frequency as the pulses comprising the d-c gate signal, and it is referred to herein as the extended chopper turn on signal. Whenever the burst firing means is effective to supply the gate driver 194 with this extended chopper turn on signal, the gate driver responds by supplying a correspondingly extended initial firing signal to the main thyristor of the chopper 12. A gate driver well suited for this purpose is described and claimed in copending patent application Ser. No. 35,351 filed concurrently herewith for R. B. Bailey and assigned to the General Electric Company. Concurrently with the extended chopper turn on signal, and for whatever additional time is necessary in order for $I_A$ to attain the aforesaid 100-amp threshold, the commutation suppressing signal on line 197 is in a 1 state (and the signal on line 234 is 0), thereby disabling the AND logic circuit 233 and preventing the chopper pulses block 193 from producing any second gating signals that would otherwise cause the gate driver 195 to fire the commutating thyristor and turn off the chopper.

With one exception, the chopper pulses block for the No. 2 chopper control means 23 is the same as the block 193 shown in FIG. 10. The one exception involves the connections to the master clock 44. Where FIG. 10 shows a line 45a supplied with phase 1 pulses from the master clock, the corresponding line of the No. 2 chopper pulses block should be supplied with phase 2 pulses, whereby the resetting of its ramp generator and the production of an output signal F by its V/F converter will be delayed one-third of the period of the master clock with respect to the occurance of these events in the No. 1 chopper pulses block. Similarly, the pulses block in the controls for a third chopper (not shown) should be synchronized with the phase 3 pulses of the master clock. In propulsion systems using six chopper/motor units, the master clock could be provided with a 6-phase output. In this manner the respective choppers are turned off in sequence rather than in unison. By thus staggering the off times of the respective choppers, the amplitude of ripple current in the filter 32 is desirably minimized.

FIGS. 12–15

Having described the various power and control components of the illustrated propulsion system, the operation of the system during electrical braking will now be summarized with the aid of FIGS. 12–15. FIG. 12 is a simplified diagram of the filter capacitor 60, the d-c bus 31, and the first chopper/motor unit 12/M1 after reconnection for the braking mode of operation. In this figure the dynamic brake resistor grid is shown at 264, the lumped resistance of the motor armature and field and of the cables in the armature current path are represented by a single resistor 265, and the lumped inductances of these components are represented by a single inductor 266. While not shown in FIG. 12, other chopper/motor units of the propulsion system are of course connected across the d-c bus conductors 31p and 31n in parallel with the unit 12/M1. The practice of the present invention is not limited to the particular propulsion system shown in FIG. 12, and it is useful, for example, in propulsion systems of the type disclosed in U.S. Pat. No. 4,051,421 issued on Sept. 27, 1977, to T. R. Brinner and T. D. Stitt and assigned to the General Electric Company. FIG. 13 illustrates such an alternative system in its electrical braking configuration. Switching means 267 connects a dynamic brake resistor 268 across the parallel branch of the armature current path that includes the chopper 12, and additional resistance 269 shunted by second switching means 270 can be inserted in the armature current path by opening the latter switching means when desired. In this embodiment the armature current path during braking includes a flyback diode 271 instead of the contactor B. A separate set of resistors 268, 269 and switches 267, 270 is required for each of the individual chopper/motor units of the propulsion system.

In electrical braking, the motor M1 behaves as a generator. Its armature is driven by mechanical inertia of the vehicle and exerts on the wheels to which it is coupled a negative (braking) torque that is a function of the generated current. Thus $I_A$ is a measure of braking effort. The armature current path for the motor M1 in FIG. 12 and the corresponding paths for the other traction motors (not shown) of the same propulsion system include the dynamic braking resistance 264. The electrical energy generated by each motor is dissipated in the form of heat by the IR losses in the armature current path. While part of the power loss takes place in the armature and field windings of the individual motors, in the associated chopper (when turned on), and in the resistance 265, most of the braking energy of all of the motors is intended to be dissipated in the resistor grid 264. (Although the illustrated embodiment of the invention employs dynamic braking, the invention can be practiced equally well in regenerating systems where braking energy is fed back to a receptive source.)

The voltage across the filter capacitor is $V_F$. With contactor BB closed, the same voltage is impressed across the resistor grid, and its average magnitude is equal to the square root of the product of the resistance (in ohms) of the grid times the power (in watts) being dissipated therein. When the chopper 12 is turned off and constant current is conducted by the free wheeling rectifier FWR, the voltage $V_{ab}$ across the lumped inductance 266 and the reactor 82 in FIG. 12 is equal to $V_F - V_A$, where $V_A$ equals the electromotive force generated by the machine M1 less the sum of the voltage drop across the lumped resistor 265 and the forward voltage drop across FWR. The magnitude of the electromotive force varies directly with motor speed and also as a function of $I_A$ which excites the series field of the motor M1. (Note that if the chopper 12 were never turned on, $I_A$ and hence braking effort would be zero so long as $V_F$ exceeds $V_A$, as would be true at low motor speeds).

In order to control $I_A$ as speed is reduced and therefore achieve relatively high and constant braking effort at low speed, the chopper 12 is periodically turned on during the braking mode of operation, and its duty factor is varied as a function of the value of the control signal $V_C$. When the chopper is turned on and conducting constant armature current, $V_{ab}$ is positive and equal to $V_A$ (assuming the forward voltage drop across the chopper is not materially different than the forward drop across FWR). If $V_F$ is greater than $V_A$, during the off time of the chopper $V_{ab}$ is negative. In order to regulate armature current $I_A$ (and hence braking effort) to a preset constant average magnitude determined by the current call signal I*, the average magnitude of $V_{ab}$ must be zero. Otherwise, $I_A$ would be either increasing (if the average were positive) or decreasing (if the average were negative). A zero average requires that $V_F$ be greater than $V_A$, and it requires a chopper duty factor equal to $1 - V_A/V_F$.

Figure 14A:
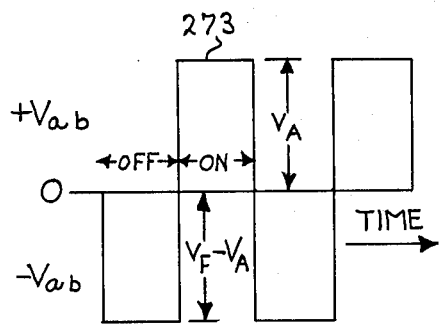
FIGS. 14A, 14B, and 14C are time charts of three different duty factors.
Figure 14B:
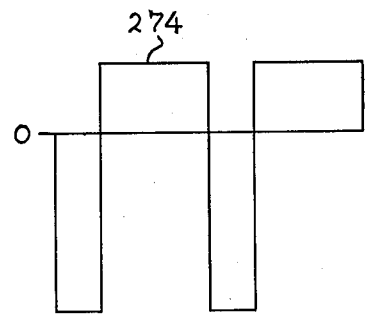
Figure 14C:
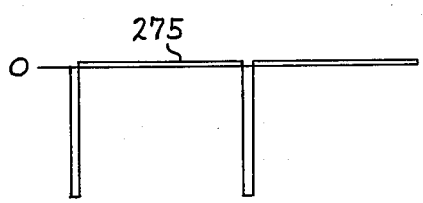

FIG. 14 shows the required duty factor during two cycles of steady state operation of the chopper 12 for each of three different speeds in the braking mode of a propulsion system having six chopper/motor units. High speed operation (e.g., 42 MPH) is illustrated by the trace 273 in FIG. 14A. At this speed with typical traction motors and other practical parameters, $V_A$ will be approximately 820 volts and $I_A$ is approximately 490 amps. Assuming that the resistance of the resistor grid is approximately 1.1 ohms, $V_F$ will be approximately 1640 volts and the duty factor is seen to be 0.5. In FIG. 14B the trace 274 illustrates $V_{ab}$ during operation at the corner point speed (e.g., 21 MPH), where $V_A$ is approximately 460 volts and $I_A$ is 880 amps. The power ($6 \times V_A \times I_A$) dissipated in the resistor grid at this speed is substantially the same as at the higher speed. Therefore $V_F$ remains nearly 1640 volts and the duty factor is approximately 0.72. In FIG. 14C the trace 275 illustrates $V_{ab}$ during operation at a much lower speed (e.g., 4 MPH) with $I_A$ maintained at 880 amps. $V_A$ is now approximately 34 volts, while $V_F$ has fallen to the minimum level of 850 volts that is maintained by the controllable converter 33 during braking. Therefore the duty factor is now 0.96 which is higher than the maximum obtainable when the chopper is in its constant frequency mode. The desired duty factor is obtained by reducing the chopping frequency (to approximately 267 Hz) while maintaining the minimum off time.

Figure 15:
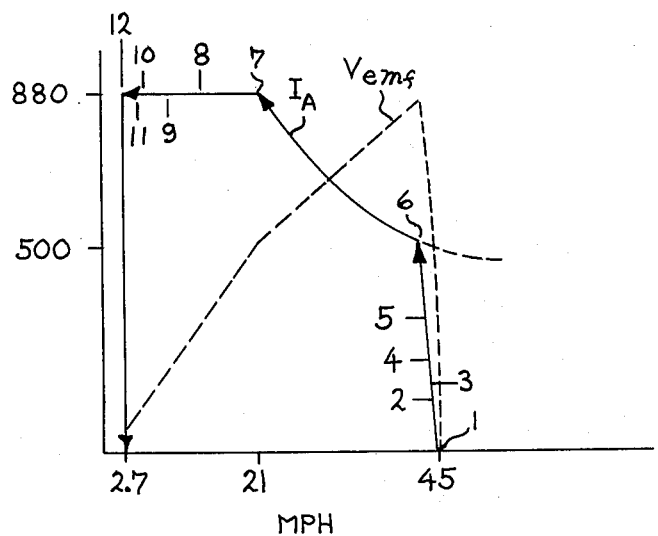
FIG. 15 is a graph showing the manner in which armature current and electromotive force of the traction motor vary with speed as the vehicle is electrically braked from 45 to 2.7 miles per hour.

FIG. 15 traces the armature current $I_A$ and the electromotive force $V_{emf}$ generated by the motor M1 during an electrical braking process that begins at 45 MPH and that continues at the maximum braking rate until the vehicle has decelerated to a low speed of 2.7 MPH. (A level track is assumed.) Point 1 marks the initial turn on of the chopper 12 by the burst firing means of this invention, which takes place approximately one-half second after the chop enable signal on line 107 enables the current reference signal $I_{REF}$ in the chopper reference means 192 (FIGS. 5 and 9) to begin ramping up, at a rate of 200 amps per second, from its negative reset level to a value corresponding to the desired magnitude of armature current, which value will ultimately be determined by the current call signal I* from the reference generator 100 in the master controls (FIG. 5). Prior to this initial turn on of the chopper, the field boost means is operative to increase $V_{emf}$, but there is no current in the armature current path because the filter capacitor voltage $V_F$ is greater than $V_{emf}$ and the free wheeling rectifier FWR is reverse biased. Therefore $I_A$ starts rising from 0 at point 1, and it quickly attains the 100 amp-threshold at point 2 in FIG. 15, whereupon the commutation suppressing signal on line 197 terminates and the chopper pulses block 193 (FIGS. 5 and 10) is able to produce a second gating signal for firing the commutating thyristor and hence turning off the chopper 12. Thereafter the chopper pulses block 193 alternately produces its first and second gating signals at a duty factor determined by $V_C$, whereby $I_A$ proceeds to track $I_{REF}$.

As $I_A$ increases, so does field excitation, and this causes the volts per RPM to increase along the field saturation curve of the motor M1. As the generated voltage increases, so does $V_A$. The power to be dissipated in the dynamic braking resistor grid rises with the product of $I_A$ and $V_A$, and this pumps up the filter capacitor voltage $V_F$. At high speeds, $V_A$ is sufficiently high when $I_A$ traverses point 3 in FIG. 15 to raise $V_F$ above 1200 volts (assuming six chopper/motor units and braking resistance of at least four ohms), and between points 3 and 10 the staging means 165 in the brake controls (FIG. 6B) will switch the staging contactors B1 and B2 (FIG. 2) as necessary to maintain $V_F$ in a range between 1200 and 1650 volts. For example, at point 4 $V_F$ reaches 1650 volts and the staging means responds by closing contactor B1 to reduce the dynamic brake resistance. Again at point 5, $V_F$ reaches 1650 volts and the staging means responds by closing contactor B2 to further reduce the resistance to its minimum value (e.g., 1.1 ohms).

At point 6 in FIG. 15, armature current intersects the constant power segment of the current call signal curve that is set by the reference generator 100, and from this point $I_{REF}$ tracks I*. Maximum power is now being dissipated in the resistor grid, and $V_F$ is nearly 1650 V. At point 6 the duty factor of the chopper is approximately 0.5 (see FIG. 14A). The vehicle is being retarded by the braking effort that increases with $I_A$, and as it decelerates (above corner point speed) I* is increased exponentially by the reference generator 100. FIG. 15 reveals that speed decreases, $V_{emf}$ decreases, and power remains substantially constant as $I_A$ increases from point 6 to the corner point 7.

From point 7 to point 12 of FIG. 15, the vehicle is braking at maximum, constant current. The chopper duty factor at the corner point is illustrated in FIG. 14B. As speed decreases from the corner point 7, the generated voltage decreases and the duty factor will be increased in order to regulate $I_A$ to the constant magnitude called for. As voltage decreases, so does the power to be dissipated in the resistor grid, and consequently $V_F$ decreases. At point 8 $V_F$ reaches 1200 volts, and the staging means responds by opening the contactor B2 to increase the dynamic brake resistance. Although $I_A$ tends to decrease when B2 is opened because of the resulting step increase in $V_F$, the chopper reference means 192 quickly responds by increasing $V_C$, and hence the duty factor of the chopper, as necessary to maintain the called for magnitude of current, and there is no noticeable torque bump in the braking process. At point 9 $V_F$ again falls to 1200 volts, and the staging means opens B1 to insert the maximum resistance of the grid. As speed decreases from point 10 to point 11, $V_F$ drops below 1200 volts and decreases to a minimum of 850 volts, whereupon the controllable converter 33 begins charging the filter capacitor 60 from the power source so as to maintain this minimum level. The minimum level of $V_F$ is selected to ensure sufficient voltage for successful operation of the commutating circuit in the chopper 12, whereby proper operation of the chopper can continue during low speed electrical braking when the generated voltage is very low.

When speed has decreased to a minimum of approximately 2.7 MPH, at point 12 in FIG. 15, $V_{emf}$ is just equal to the sum of the voltage drops across the chopper 12 and the lumped resistance of the armature current path, and therefore $V_A$ is 0. The duty factor is now 1.0, and the chopper can no longer control $I_A$ which rapidly decays from its called for magnitude. Decreasing current in the motor field results in less electromotive force, and the system collapses. This is the low speed brake fadeout point of the illustrated propulsion system. Additional braking at such low speeds can easily be effected by conventional friction or air brakes. Note that the minimum fadeout speed of electrical braking is even lower than 2.7 MPH if the brake controller is calling for less than maximum $I_A$. Note also that the fade out speed of electrical braking would be appreciably higher than 2.7 MPH if the duty factor were limited to a maximum of 0.91.

While a preferred embodiment of the invention has been shown and described by way of example, many modifications will undoubtedly occur to persons skilled in the art. The concluding claims are therefore intended to cover all such modifications as fall within the true spirit and scope of the invention.

What we claim as new and desire to secure by Letters Patent of the United States is:

1. Improved means for effecting electrical braking of a traction vehicle equipped with a propulsion system having motoring and braking modes of operation, said propulsion system comprising a d-c traction motor that behaves as a generator during said braking mode of operation, said motor having an armature and a series field winding and said propulsion system further comprising a filter capacitor adapted to be coupled to a siource of d-c electric power, a chopper, means for connecting said chopper in series with said armature and field windings across said capacitor when the propulsion system is operating in its motoring mode, cyclically operative means for normally producing periodic gating signals of relatively short predetermined duration, means responsive to said gating signals for alternatively turning on and turning off said chopper, and free wheeling rectifier means connected in circuit with said armature and series field winding to conduct motor current during intervals when said chopper is turned off, wherein the improvement comprises:

(a) command means having alternative motoring and braking states;
 (b) brake set up means operative in response to a motoring-to-braking state change of said command means for reconnecting the propulsion system to establish an armature current path comprising said field winding in series with first and second parallel branches, said first branch including said chopper and said second branch including said capacitor in series with said free wheeling rectifier means, and for reversing the polarity of the connection of said series field winding relative to said armature, said brake set up means being effective whenever said command means is in its braking state to maintain said armature current path and to maintain the reversed polarity connection of said field winding and armature; and
 (c) burst firing means effective in response to the reconnecting operation of said brake set up means and the start of a braking state of said command means for supplying to said gating signal responsive means an extended chopper turn-on signal having a duration substantially longer than said predetermined duration of the gating signals normally produced by said cyclically operative means, thereby ensuring that said chopper turns on and conducts armature current to begin the braking mode of operation of the propulsion system.

2. The improvement as set forth in claim 1 wherein said burst firing means is also effective for disabling said cyclically operative means to prevent it from producing any gating signals that would otherwise turn off said chopper until the magnitude of armature current increases to at least a predetermined threshold, whereupon said cyclically operative means can resume normally producing gating signals to alternately turn off and turn on the chopper.

3. The improvement as set forth in claim 1 wherein the duration of said extended chopper turn-on signal is at least 100 times longer than said predetermined duration of the gating signals normally produced by said cyclically operative means.

4. The improvement as set forth in claim 1 wherein resistance means is provided for dissipating electrical braking energy and said brake set up means is additionally effective to connect said resistance means in parallel circuit relationship with said capacitor when said command means changes from motoring to braking states and whenever said command means is in its braking state.

5. The improvement of claim 4 wherein said resistance means is connected across said capacitor in said second branch of said armature current path.

6. The improvement of claim 4 wherein said resistance means is connected across said second branch of said armature current path.

7. The improvement as set forth in claim 1 including field boost means temporarily operative in response to the reconnecting operation of said brake set up means and the start of a braking state of said command means for momentarily increasing current in said field winding to ensure an increase of voltage across the armature of said motor at the beginning of the braking mode of operation, said burst firing means being connected to said field boost means and being arranged to delay said extended chopper turn on signal until after the start of field current increases by said field boost means.

8. The improvement as set forth in claim 7 wherein speed sensing means is provided for sensing the angular velocity of the armature of said motor, and wherein said field boost means includes means connected to said speed sensing means for preventing operation of said field boost means whenever said angular velocity is below a predetermined low magnitude and for causing operation of said boost means in response to said velocity increasing from below to above said predetermined magnitude at any time after operation of said brake set up means and while said command means is in its braking state.

9. The improvement of claim 7 wherein said field boost means is operative to increase current in said field winding for a period of approximately one second.

10. The improvement as set forth in claim 9 wherein said burst firing means becomes effective approximately midway through the period of time that said field boost means is operative.

11. The improvement as set forth in claim 1 including means for providing a current reference signal representative of the desired magnitude of current in the armature of said motor, means for providing a feedback signal representative of the actual magnitude of armature current, and means for deriving a control signal having a value that varies as a function of any difference between said current reference and feedback signals, said cyclically operative means being connected to said control signal deriving means and being so constructed and arranged that the timing of said gating signals and consequently the duty factor of said chopper are determined by the value of said control signal.

12. The improvement of claim 11 and further including means connected to said reference signal providing means and responsive to said command means changing states for resetting said current reference signal to a value corresponding to zero current and thereby altering the value of said control signal as necessary to ensure that the chopper duty factor is rapidly reduced to zero.

13. The improvement of claim 11 for effecting electrical braking of a traction vehicle equipped with a propulsion system supplied from a source of d-c electric power including a controllable electric power converter having a set of input terminals and a pair of d-c output terminals, means for connecting said capacitor between said output terminals, means including a contactor for connecting said input terminals to a source of relatively constant voltage, and regulating means for controlling said converter so as to limit the average magnitude of capacitor voltage to a maximum level determined by a voltage reference signal when the propulsion system is operating in its motoring mode, wherein said command means is coupled to said current reference signal providing means and, prior to changing states, calls for a current reference signal value corresponding to a low magnitude of armature current, and wherein the improvement further comprises means for opening said contactor and thereby disconnecting said converter from said voltage source in response to the start of a motoring-to-brake state change of said command means and means for reclosing said contactor in response to the operation of said brake set up means.

14. The improvement of claim 13 wherein means is provided for setting said voltage reference signal at a value that will prevent the capacitor voltage from falling below a predetermined minimum level when the propulsion system is operating in its braking mode.

15. The improvement of claim 13 wherein bi-stable chopper enable means is connected to said capacitor and to said field boost means, said chopper enable means being in one state when the capacitor voltage is relatively high and in another state when the capacitor voltage is relatively low and being effective only in said other state for disabling said burst firing means and thereby preventing it from supplying said extended chopper turn-on signal.

16. The improvement of claim 15 wherein means is provided for setting the value of said voltage reference signal, said last-mentioned means being reset in response to the opening of said contactor and being effective upon reclosing said contactor to vary said voltage reference signal at a predetermined rate until it attains a value corresponding to a predetermined level of capacitor voltage.

17. The improvement of claim 13 wherein bistable chopper enable means is connected to said capacitor and to said current reference signal providing means, said chopper enable means being in one state when the capacitor voltage is relatively high and in another state when the capacitor voltage is relatively low and being effective only in said other state for resetting said current reference signal to a value corresponding to zero current, whereby an appropriate control signal value is attained to ensure that the chopper duty factor is zero until said chopper enable means changes from said other state to said one state.

18. Improved means for effecting electrical braking of a traction vehicle equipped with a propulsion system having motoring and braking modes of operation, said propulsion system comprising a d-c traction motor that behaves as a generator during said braking mode of operation, said motor having an armature and a series field winding and said propulsion system further comprising a filter capacitor adapted to be coupled to a source of d-c electric power, a chopper, means for periodically turning on and turning off said chopper in response, respectively, to alternate first and second gating signals, means for connecting said chopper in series with said armature and field winding across said capacitor when the propulsion system is operating in its motoring mode, and free wheeling rectifier means connected in circuit with said armature and series field winding to conduct motor current during intervals when said chopper is turned off, wherein the improvement comprises:

(a) means for supplying a variable control signal having a value that can vary between predetermined low and high extremes and that can traverse a predetermined intermediate value in between said low and high extreme values;

(b) cyclically operative means connected to said control signal supply means for normally producing alternate first and second gating signals for respectively turning on and turning off said chopper, each of said gating signals having a relatively short predetermined duration, and the interval from the production of one of said second gating signals to the production of the succeeding first gating signal being referred to as the off time of said chopper, said cyclically operative means being so constructed and arranged that
(i) whenever the value of said control signal is at its low extreme no gating signals are produced and said chopper is continuously turned off,
(ii) when said control signal is in a predetermined range between said low extreme value and said predetermined intermediate value said second gating signals are produced at a predetermined constant frequency while said off time varies inversely with the value of said control signal and decreases toward a predetermined minimum as said control signal approaches said intermediate value, and
(iii) whenever said control signal is between said intermediate value and said high extreme value said second gating signals are produced at an average frequency that varies inversely with the control signal value and decreases from said constant frequency toward zero as the control signal approaches said high extreme while said off time is maintained substantially equal to said predetermined minimum;
(c) command means having alternative motoring and braking states; and
(d) brake set up means operative in response to a motoring-to-braking state change of said command means for reconnecting the propulsion system to establish an armature current path comprising said field winding in series with first and second parallel branches, said first branch including said chopper and said second branch including said capacitor in series with said free wheeling rectifier means, and for reversing the polarity of the connection of said series field winding relative to said armature, said brake set up means being effective whenever said command means is in its braking state to maintain said armature current path and to maintain the reversed polarity connection of said field winding and armature.

19. The improvement as set forth in claim 18 wherein said control signal supplying means comprises means for providing a current reference signal representative of the desired magnitude of current in the armature of said motor and means for providing a feedback signal representative of the actual magnitude of armature current, the value of said control signal being varied as a function of the difference between said current reference and feedback signals in a sense approaching said high extreme from said low extreme so long as the actual current magnitude is less than the desired current magnitude.

20. The improvement of claim 19 and further including means connected to said reference signal providing means and responsive to said command means changing states for resetting said current reference signal to a value corresponding to zero current and thereby altering the value of said control signal as necessary to ensure that it attains said low extreme, thereby ensuring that the chopper is turned off and that armature current decreases to zero.

21. The improvement as set forth in claim 18 and further including burst firing means effective in response to the reconnecting operation of said brake set up means and the start of a braking state of said command means for supplying to said chopper turn on and turn off means an extended chopper turn-on signal having a duration substantially longer than said predetermined duration of the first and second gating signals normally produced by said cyclically operative means, thereby ensuring that said chopper turns on and conducts armature current to begin the braking mode of operation of the propulsion systems.

22. The improvement of claim 21 including field boost means temporarily operative in response to reconnecting operation of said brake set up means and the start of a braking state of said command means for momentarily increasing current in said field winding to ensure an increase of voltage across the armature of said motor at the beginning of the braking mode of operation, said burst firing means being connected to said field boost means and being arranged to delay said extended chopper turn on signal until after the start of field current increase by said field boost means.

23. The improvement of claim 22 wherein speed sensing means is provided for sensing the angular velocity of the armature of said motor, and wherein said field boost means includes means connected to said speed sensing means for preventing operation of said field boost means whenever said angular velocity is below a predetermined low magnitude.

24. The improvement of claim 21 wherein said burst firing means is also effective for disabling said cyclically operative means to prevent it from producing any second gating signal until the magnitude of current in the armature of said motor increases to at least a predetermined threshold, whereupon said cyclically operative means can resume normally producing any second gating signal until the magnitude of current in the armature of said motor increases to at least a predetermined threshold, whereupon said cyclically operative means can resume normally producing second gating signals alternating with said first gating signals.

25. The improvement of claim 24 wherein said control signal supplying mean is so constructed and arranged that the value of said control signal varies as a function of any difference between actual and desired magnitudes of armature current.

26. The combination as set forth in claim 18 wherein resistance means is provided for dissipating electrical braking energy and said brake set up means is additionally effective to connect said resistance means in parallel circuit relationship with said capacitor when said command means changes from motoring to braking states and whenever said command means is in its braking state.

* * * * *

UNITED STATES PATENT AND TRADEMARK OFFICE
CERTIFICATE OF CORRECTION

PATENT NO. : 4,284,936

DATED : August 18, 1981

INVENTOR(S) : Ronald B. Bailey; Thomas D. Stitt

It is certified that error appears in the above-identified patent and that said Letters Patent are hereby corrected as shown below:

Column 2, line 62, delete "so"

Column 4, line 13, cancel "fluid" and substitute --field--

Column 37, line 64, cancel "siource" and substitute --source--

Column 39, line 6, change "increases" to --increase--

Column 42, line 15, change "systems." to --system.--

Signed and Sealed this

Twenty-seventh Day of October 1981

[SEAL]

Attest:

Attesting Officer

GERALD J. MOSSINGHOFF

Commissioner of Patents and Trademarks